United States Patent
Karlsson et al.

(10) Patent No.: US 9,362,832 B2
(45) Date of Patent: Jun. 7, 2016

(54) INTERMEDIATE BUS ARCHITECTURE POWER SUPPLY

(71) Applicant: TELEFONAKTIEBOLAGET L M ERICSSON (PUBL), Stockholm (SE)

(72) Inventors: Magnus Karlsson, Oskarshamn (SE); Oscar Persson, Kalmar (SE); Henrik Borgengren, Kalmar (SE); Martin Hägerdal, Djursholm (SE); Gary Edmonds, Bedminster, NJ (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 221 days.

(21) Appl. No.: 14/188,806

(22) Filed: Feb. 25, 2014

(65) Prior Publication Data

US 2015/0244270 A1     Aug. 27, 2015

(51) Int. Cl.
*H02M 3/335*     (2006.01)
*H02M 1/32*     (2007.01)
*H02M 1/00*     (2006.01)

(52) U.S. Cl.
CPC ............ *H02M 3/33507* (2013.01); *H02M 1/32* (2013.01); *H02M 3/33523* (2013.01); *H02M 2001/008* (2013.01)

(58) Field of Classification Search
CPC ................. H02M 2001/008; H02M 2001/007; H02M 3/33523; H02M 3/33553; H02M 3/33561; H02M 3/33592; H02J 1/108
See application file for complete search history.

(56) References Cited

U.S. PATENT DOCUMENTS

| | | | |
|---|---|---|---|
| 5,991,169 A * | 11/1999 | Kooken | B23K 9/1056 219/137 PS |
| 7,269,034 B2 | 9/2007 | Schlecht | |
| 7,272,021 B2 | 9/2007 | Schlecht et al. | |
| 7,558,083 B2 | 7/2009 | Schlecht | |
| 7,564,702 B2 | 7/2009 | Schlecht | |
| 7,787,261 B2 | 8/2010 | Farrington et al. | |
| 9,087,656 B1 * | 7/2015 | Vinciarelli | H01H 9/54 |
| 2004/0095111 A1 * | 5/2004 | Kernahan | H02M 3/157 323/282 |
| 2005/0270812 A1 * | 12/2005 | Vinciarelli | H02M 3/157 363/65 |
| 2014/0241013 A1 * | 8/2014 | Suzuki | H02M 3/33507 363/21.01 |

* cited by examiner

Primary Examiner — Harry Behm

(57) ABSTRACT

An intermediate bus architecture power supply system including an output voltage feedback-regulated, isolated first stage switching voltage converter (SVC) such as an intermediate bus converter, connected via an intermediate voltage bus (IVB) to at least one second stage DC-to-DC voltage converter. The first stage SVC is configured to adjust its switching duty cycle to compensate for voltage fluctuations on the IVB. The voltage regulation mechanism of the first stage SVC may thus suppress oscillations in the IVB voltage which originate from the first stage SVC's input or from fluctuations in the system's load current, and consequently reduce electromagnetic interference as well as the amplitude of voltage and current fluctuations on the IVB.

24 Claims, 22 Drawing Sheets

INTERMEDIATE BUS ARCHITECTURE POWER SUPPLY

TECHNICAL FIELD

The present invention relates to Intermediate Bus Architecture (IBA) power supply systems and more specifically to voltage regulation in a voltage converter of the IBA power supply system.

BACKGROUND

A voltage converter can be used to supply power to various kinds of electrical devices, and operates by converting an input voltage received at its input terminal to an output voltage provided at an output terminal of the voltage converter. A voltage converter can take one of many different forms, which may be selected depending on the requirements of the application at hand. For example, the switching voltage converter (also known as a switched mode power supply, SMPS) is a well-known type of voltage converter that is well-suited to use in personal computers and portable electronic devices such as cell phones, for example, owing to its small size and weight, and high efficiency. A switching voltage converter achieves these advantages by switching one or more switching elements such as power MOSFETs at a high frequency (usually tens to hundreds of kHz) to convert the input voltage to an output voltage. A voltage converter may take the form of a rectifier (AC/DC converter), a DC/DC converter, a frequency changer (AC/AC) or an inverter (DC/AC), for example.

There are, however, applications whose requirements cannot be met by a single voltage converter. For example, the demand for ever faster and more complex signal processing has fuelled the need for new generations of signal processing systems having multiple high-performance processors, which are characterised by their need for multiple low supply voltages, high current demand and tight supply voltage regulation requirements. These needs are met by power supply systems such as the Intermediate Bus Architecture (IBA) power supply system, which employ a multi-stage voltage conversion arrangement having multiple voltage converters to derive a number of tightly-regulated voltages from an input power source.

FIG. 1 shows a schematic of a conventional IBA power supply system 1000, which is an example of a multi-stage power distribution system. More particularly, the power supply system 1000 shown in FIG. 1 is an example of a three-stage power distribution system, wherein power is fed via one or more optional input stage modules to one or more first stage voltage converters, and subsequently to one or more second stage voltage converters. More specifically, in this example, power from mains voltage sources $V_{lineA}$ and $V_{lineB}$ is fed to respective inputs of an input-stage module, which is provided in the exemplary form of a single Power Input Module (PIM) 1100 in the present example. The PIM 1100 may also perform OR-ing between the mains supplies $V_{lineA}$ and $V_{lineB}$ and, in addition, provide filtering and store charge to handle interruptions in power delivery from the mains voltage sources. The power output terminal of the PIM 1100 is connected via a power bus 1200 to the input of at least one first-stage voltage converter, which is provided in the exemplary form of an intermediate Bus Converter (IBC) 1300 in the present example. More generally, a plurality of input-stage modules may be connected via the power bus 1200 to a plurality of first-stage voltage converters. The output of the IBC 1300 is connected via an Intermediate Voltage Bus (IVB) 1400 to a plurality of second-stage voltage converters in the exemplary form of Point-of-Load (POL) regulators 1500, each of which delivers a regulated voltage to one of a plurality of loads 1600. As shown in the example of FIG. 1, any number of POL regulators, 1500-1 to 1500-K, and any number of loads, 1600-1 to 1600-K, may be provided and each load may be connected to a plurality of POL regulators. For simplicity, isolation barriers, Bus drivers, Bus isolators and signal filters are not shown in FIG. 1.

In the interests of maximising the efficiency of the IBC 1300, the IBC 1300 is typically chosen to provide an unregulated output voltage, taking the form of a fixed voltage conversion ratio DC/DC converter. Thus, the IBC 1300 provides a fixed voltage conversion ratio (i.e. input-to-output ratio), most commonly 4:1, 5:1 or 6:1.

In more detail, the IBC 1300 is usually provided in the form of an isolated voltage converter having a primary side circuit, a secondary side circuit and an isolating voltage transformer therebetween. The voltage transformer galvanically isolates the primary side circuit from the secondary side circuit, by AC-coupling the two circuits whilst providing no direct current (DC) path between them. The IBC 1300 thus provides an isolation barrier between the inputs and outputs of the IBA power supply system 1000, with there being no DC connection between the IBC's primary side circuit and secondary side circuit. Providing such an isolation barrier at the IBC 1300 is more cost-effective than providing isolation in each of the POL regulators 1500-1 to 1500-K, owing to the cost of manufacturing isolating voltage transformers.

The primary side circuit of the IBC 1300 is connected to the input of the IBC 1300 and contains at least one switching element which is repeatedly switched with the required switching duty cycle (typically set close to 100%, in order to maximise the IBC's efficiency) to produce an alternating voltage across a primary winding of the voltage transformer. The voltage transformer AC couples the primary and secondary windings, and the secondary side circuit of the IBC 1300 rectifies the voltage induced in the secondary winding of the voltage transformer to produce the output voltage that is output by the IBC 1300 to the IVB 1400. The output voltage of the IBC 1300 varies with the input voltage, Vin, as n×Vin, where n is the transformer turns ratio.

Other conventional IBA power supply systems employ a semi-regulated IBC instead of a fixed voltage conversion ratio IBC as described above. In these systems, the semi-regulated IBC provides line regulation to compensate for variations in the IBC's input voltage but at the expense of varying the switching duty cycle, which reduces power efficiency. Furthermore, the IBC's load current affects the IBC's output voltage, with the output voltage decreasing with increasing load current—a phenomenon widely referred to as "droop". The IBC's output voltage is then given by Vzero—Rdroopl-load, where Vzero is the idling voltage at zero load, and $R_{droop}$ is the equivalent resistance that consists of different internal parasitic resistances that make the output voltage drop as the load current increases.

As a further alternative, the IBC 1300 may be quasi-regulated, applying line regulation in only a part of the input voltage range, while remaining unregulated with a switching duty cycle close to 100% in other parts of the input voltage range. This control scheme yields an increased input voltage range without increasing the output voltage range.

Examples of conventional IBA power supply systems and IBCs are given in U.S. Pat. Nos. 7,787,261; 7,272,021; 7,558,083; 7,564,702; and 7,269,034.

In general, each of the second stage DC/DC converters may be isolated or non-isolated. However, where isolation is provided by the IBC 1300, the POL regulators 1500-1 to 1500-K are preferably all non-isolated. A second stage DC/DC converter may take the form of an SMPS or alternatively a non-switched linearly-regulated Low Drop Out (LDO) regulator. Each POL (k) delivers a regulated voltage $V_{load\_k}$ to its load 1600-k. In the example of FIG. 1, POL regulators 1500-1 and 1500-2 deliver power to a common load 1600-1 (although, naturally, more than two POL regulators may deliver power to a common load). With the step-down ratio of the IBC 1300 fixed at a pre-selected value, the voltage $V_{IB}$ on the IVB will, of course, vary with changes in the input voltage to the IBC 1300, thus requiring the POL converters to be capable of operating over a range of input voltages, typically 3-15 V.

Although the POL regulators 1500-1 to 1500-K are buck regulators in the example of FIG. 1, their topology is not limited to such and may alternatively be Boost, Buck-Boost etc.

During normal operation of the IBA power supply system 1000, fluctuations in the power bus voltage Vin frequently occur, which may be large enough to damage the IBC 1300. Furthermore, as the IBC 1300 may transmit a damped form of these voltage fluctuations to the IVB 1400 (by virtue of the IBC's fixed voltage transformation ratio), damage may also be sustained by the downstream components of the IBA power supply system, as these components (including the POL regulators) may be forced to operate at voltages that are outside their rated ranges. As the IVB 1400 often as a large decoupling capacitance in conventional IBA power supply systems, the voltage fluctuations on the IVB 1400 may also cause high inrush currents to flow in the IVB 1400, which may damage some of the IBA power supply system components connected to it. In addition, transients on the IVB 1400 that occur on too short a timescale for a POL regulator's feedback loop to respond to may be transmitted to the POL regulator's output, and thus potentially damage the POL regulator's load. Similar problems may also occur during start-up of the IBA power supply system 1000 or during other step changes in the input voltage Vin.

The IBA power supply system 1000 may employ one or more safety mechanisms to protect itself (or its loads) from sustaining damage in one of these ways.

For example, an excessively high current flowing into, or out of, the IBC 1300 may cause damage to the IBC 1300 or the downstream components. In order to reduce the risk of damage, the IBC 1300 typically includes an Over Current Protection (OCP) circuit that shuts down the IBC 1300 when the input current level, or the output current level, exceeds respective threshold levels.

In a similar way, to reduce the risk of damage being caused by excessively high voltages, the POL regulators 1500-1 to 1500-K may each have an Over Voltage Protection (OVP) circuit for shutting down the POL regulator when an excessively high voltage is detected. For example, each of the POL regulators 1500-1 to 1500-K may have an input OVP circuit for shutting down the POL regulator when the voltage on the IVB 1400 is above the maximum operating voltage of the POL regulator. Similarly, to provide protection for the load circuitry, each of the POL regulators 1500-1 to 1500-K may have an output OVP circuit for shutting down the POL regulator when the POL regulator's output voltage is higher than a threshold.

On the other hand, to protect against damage due to an excessively low IVB voltage, each of the POL regulators 1500-1 to 1500-K may have an Under Voltage Lock-Out protection (UVLO) circuit, which shuts down the POL regulator when the IVB 1400 voltage is below the minimum operating voltage of the regulator 1500.

Although protection circuits of these kinds can provide effective protection for the IBA power supply system 1000, they have the disadvantage of causing the IBA power supply system 1000 (or some components thereof) to shut down in response to voltage changes or fluctuations that might otherwise be safely tolerated. For example, a large inrush current which can occur during a voltage transient or at start-up of the IBA power supply system 1000 may activate the OCP circuit in the IBC 1300, causing the IBC 1300, and thus the IBA power system 1000 as a whole in the present example, to shut down. Voltage transients on the IVB 1400 may trigger operation of the POL regulators' input OVP or UVLO circuits, causing the affected POL regulators to shut down, potentially initiating a shut-down or a restart of the IBA power supply system 1000 as a whole.

Regardless of whether they utilize protection circuits of these kinds, conventional IBA power supply systems also suffer from problems with electromagnetic interference (EMI) caused by transients on the power bus 1200 or transients in the load current of one or more of the POL regulators 1500-1 to 1500-K, which lead to oscillations on the IVB 1400 that are damped only by the inherent parasitic resistances in the IBC's output filter circuit. These problems increase when the IBA power supply system 1000 comprises a high efficiency IBC with a low parasitic resistance in its output choke, and also with increasing use of decoupling banks comprising ceramic capacitors with low equivalent series resistance (ESR).

Thus, many conventional IBA power supply systems are susceptible to high levels of EMI, and are not robust to transients or abrupt changes in the systems' input voltage or load level. As a consequence, many conventional IBA power supply systems are prone to sustaining damage or, where one or more of the above-mentioned protection circuits are employed, shutting down or restarting unnecessarily.

SUMMARY

The present inventors have considered various conventional approaches to improving the reliability of IBA power supply systems as described above, which have focused on improving the OCP, OVP and any other safety mechanisms employed by the voltage converters, or coordinating the operation of voltage converters in the system to suppress the propagation of transients and other abrupt voltage changes through the voltage conversion stages of the system. For example, to improve the IBA system's ability to handle the abrupt voltage changes that often occur at system start-up, the OCP threshold level used in the OCP protection circuit of an IBC in the system may be set to prevent the OCP circuit being tripped by an inrush current to the IVB that typically occurs at start-up. The start-up timings of the POL regulators or their under-voltage lock-out levels may also be adjusted to avoid unnecessary activation of their OCP or OVP circuits.

However, the inventors have realised that these conventional approaches make the IBA power supply system less prone to unnecessary shutdowns and restarts at the cost of an increased susceptibility to sustaining damage during normal operation, and can also increase converter complexity and cost. In particular, raising the IBC's OCP threshold level can lead to poor protection for the IBC against system malfunction, while delaying start-up of the POL regulators and adjusting their under-voltage lock-out levels can increase the system start-up time, as well as the POL regulators' circuit complexity.

The inventors have realised that the root cause of these problems are voltage fluctuations in the IVB that originate from fluctuations in the IBC's input voltage or in the load currents that are supplied by one or more of the POL regulators in the system. Instead of seeking to mitigate the effects of these IVB voltage fluctuations in line with the abovementioned conventional approaches, the present inventors have provided an effective and cost-effective way of regulating the IVB voltage that may allow the IBA power supply system's reliability to be improved without sacrificing the effectiveness of any protection mechanisms that may be present in the system.

More specifically, the present inventors have devised an IBA power supply system comprising a first stage switching voltage converter arranged to convert an input voltage at an input of the first stage switching voltage converter to an output voltage at an output of the first stage switching voltage converter, the output of the first stage switching voltage converter being connected via an IVB to an input of at least one second stage DC-to-DC voltage converter. The first stage switching voltage converter comprises a primary side circuit connected to the input of the first stage switching voltage converter and comprising a switching element, as well as a secondary side circuit that is coupled to the primary side circuit by a galvanically isolated voltage transformer which provides an isolation barrier between the primary and secondary side circuits, the voltage transformer being arranged to transform a primary side voltage generated by switching of the switching element in the primary side circuit to a secondary side voltage. The secondary side circuit also includes: a rectifying circuit arranged to rectify the secondary side voltage from the voltage transformer to generate the output voltage, and a feedback signal generator arranged to generate a feedback signal indicative of the output voltage of the first stage switching voltage converter. The first stage switching voltage converter further comprises a controller which is operable to generate a switch control signal to control a switching duty cycle of the switching element. The controller comprises: a target voltage signal generator operable to generate a target voltage signal that is indicative of a target output voltage of the first stage switching voltage converter; a deviation signal generator arranged to receive the feedback signal and operable to generate a deviation signal based on the target voltage signal and based on the feedback signal, wherein the deviation signal is indicative of a deviation of the output voltage of the first stage switching voltage converter from the target output voltage; and a switch control signal generator operable to generate the switch control signal to control the switching duty cycle of the first stage switching voltage converter in dependence upon the deviation signal.

An IBA power supply system of an embodiment includes an output voltage feedback-regulated, isolated first stage switching voltage converter such as an IBC, which adjusts its switching duty cycle to compensate for voltage fluctuations on the IVB by measuring at least one signal of the secondary side (current or voltage) and the measured signal or a transformed signal dependent on the measured signal is transmitted over the isolation barrier and is used for controlling the primary side switching in order to control the output voltage, i.e. feed-back control. The target voltage may be constant or changed by an algorithm, e.g., such as droop emulation. The controller of the first stage switching voltage converter is regulating the voltage at all times when the converter is switching. The voltage regulation mechanism of this first stage voltage converter may thus suppress oscillations in the IVB voltage (whether they originate from the first stage voltage converter's input or from fluctuations in the system's load current), and consequently may reduce EMI as well as the amplitude of voltage and current fluctuations in the IVB that underlie some of the problems with conventional IBA power supply systems that have been discussed above.

BRIEF DESCRIPTION OF THE DRAWINGS

In the following section, the invention will be described with reference to exemplary embodiments illustrated in the figures, in which.

DETAILED DESCRIPTION

Figure 1:
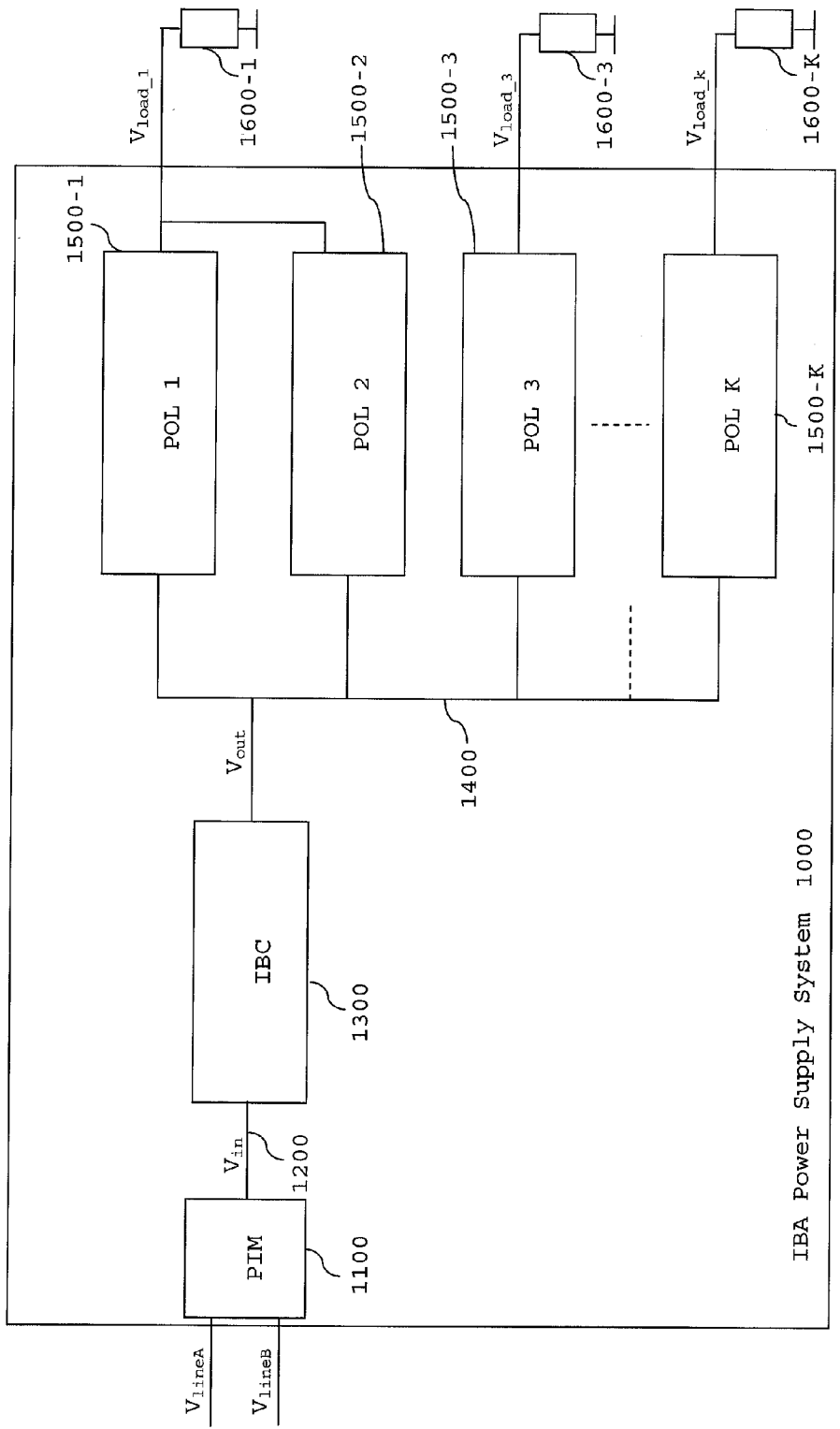
FIG. 1 (Prior Art) is a schematic of a conventional IBA power supply system.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements. Additionally, it should be understood that the invention can be implemented in hardware or a combination of software stored on a non-transitory memory and executed by a general purpose computer or microprocessor.

First Embodiment

An IBA power supply system 2000 according to a first embodiment of the present invention will now be described with reference to FIGS. 2 to 9.

Figure 2:
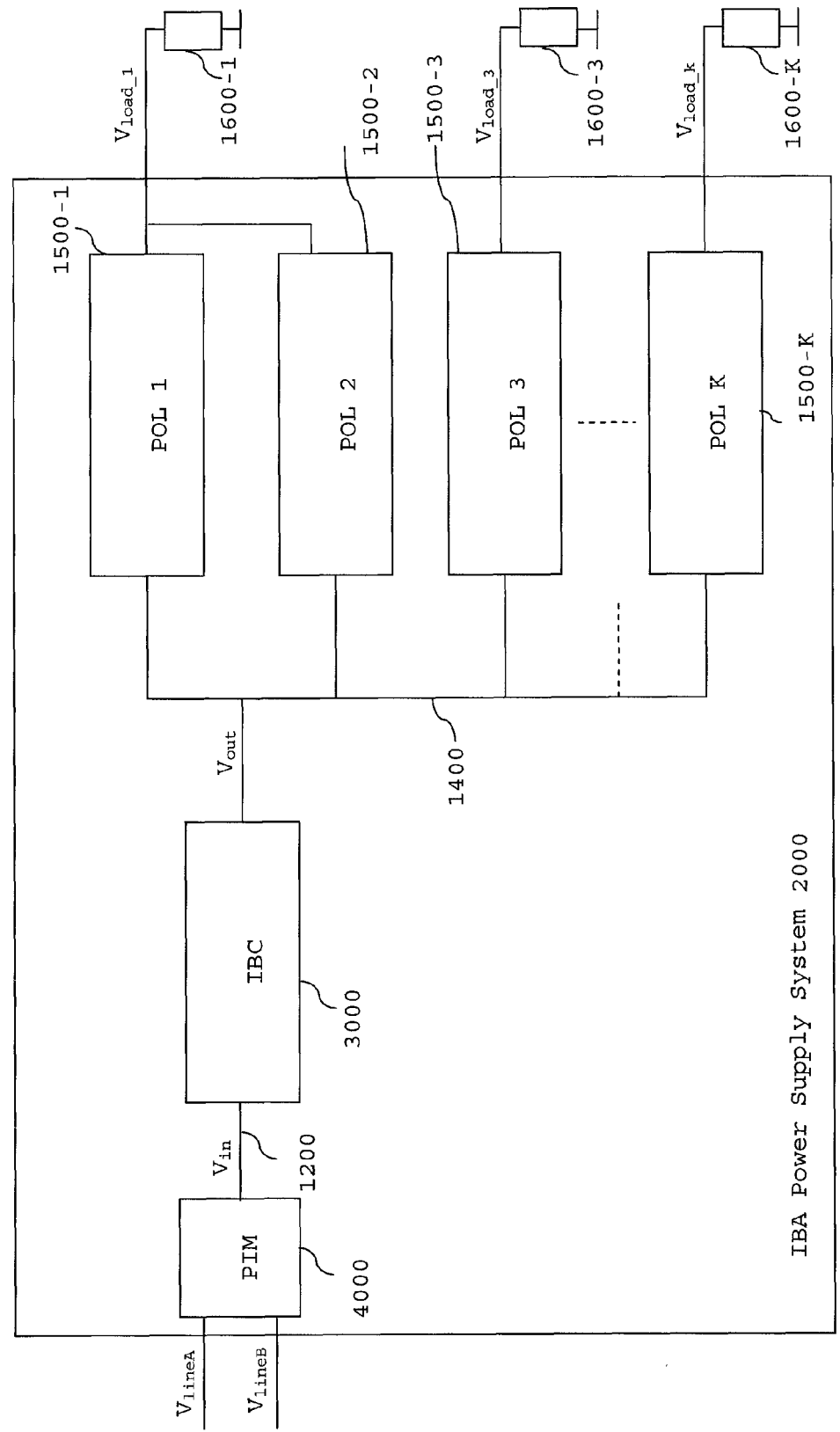
FIG. 2 is a schematic of an IBA power supply system according to an embodiment of the present invention.

FIG. 2 illustrates components of the IBA power supply system 2000 of the first embodiment, which are substantially the same as those of the background example described above with reference to FIG. 1, with like numerals indicating like components. The description of these components will therefore not be repeated here. However, the IBA power supply system 2000 of the present embodiment differs by the configuration of the IBC 3000 and the PIM 4000, which will now be described with reference to FIGS. 3-7 and 8-9, respectively.

Figure 3:
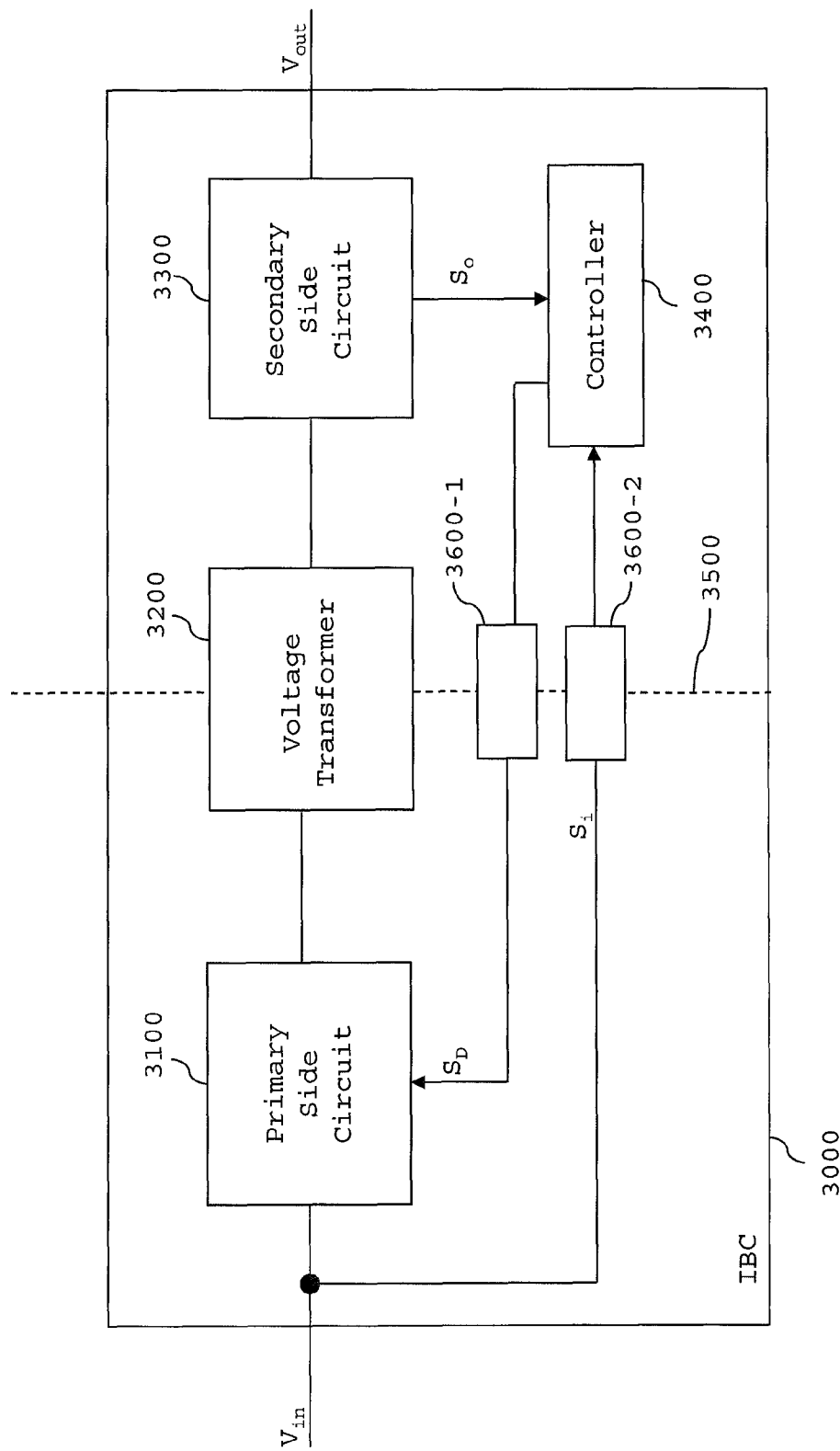
FIG. 3 provides a top-level illustration of components in the IBC shown in FIG. 2.

FIG. 3 is a block diagram providing a top-level illustration of components of the IBC 3000 of the present embodiment.

The IBC 3000 of the present embodiment is provided in the form of an isolated switching voltage converter having a primary side circuit 3100, a secondary side circuit 3300, an isolated voltage transformer 3200 and a controller 3400. The voltage transformer 3200 galvanically isolates the primary side circuit 3100 from the secondary side circuit 3300 side circuit by AC-coupling the two circuits whilst providing no DC path between them. The IBC 3000 thus provides an isolation barrier 3500 between the inputs and outputs of the IBA power supply system 1000.

The primary side circuit 3100 is connected to the input of the IBC 3000 and contains at least one switching element which is/are repeatedly switched with the required switching duty cycle to produce an alternating voltage across a primary winding of the voltage transformer 3200. The voltage transformer 3200 AC couples the primary and secondary windings, and the secondary side circuit 3300 of the IBC 1300 rectifies the voltage induced in the secondary winding of the voltage transformer 3200 to generate the output voltage $V_{out}$ that is output by the IBC 3000 to the IVB 1400.

The secondary side circuit 3300 also includes a feedback signal generator (not shown in FIG. 3), which is arranged to generate a feedback signal $S_O$ that is indicative of the voltage Vout output by the IBC 3000. The feedback signal $S_O$ may, for example, be an electrical or optical signal (analogue or digital) that provides a measure of the output voltage $V_{out}$ of the IBC 3000, and may be generated using techniques well-known to those skilled in the art.

The controller 3400 may, as in the present embodiment, be disposed on the secondary side of the isolation barrier 3500 (e.g. as part of the secondary side circuit 3300), and is configured to generate a switch control signal $S_D$ for controlling the switching duty cycle of the switching element(s) in the primary side circuit 3100, based on the feedback signal $S_O$ received thereby. For example, the controller 3400 may, as in the present embodiment, be directly connected (e.g. simply by a conductive track) to the output of the IBC 3000 such that the signal $S_O$ corresponds to the output voltage $V_{out}$. Alternatively, signal $S_O$ may be obtained by scaling the output voltage $V_{out}$ down to a lower value that is suitable for processing by the controller 3400. The signal $S_O$ may, however, be generated in other ways, and the preceding examples also apply to the generation of the signal $S_i$ discussed below.

In the present embodiment, the switch control signal $S_D$ is transmitted across the isolation barrier 3500 via a device 3600-1 for communicating information between the secondary side circuit 3300 and the primary side circuit 3100 whilst keeping the circuits galvanically isolated from each other, which may, as in the present embodiment, be provided in the form of an electo-optic converter that is optically coupled to an opto-electric converter. The controller 3400 may, as in the present embodiment, be further arranged to receive a signal $S_i$ that is indicative of the input voltage $V_{in}$ of the IBC 3000. In the present embodiment, the signal $S_i$ is similarly transmitted across the isolation barrier 3500, via a device 3600-2 which performs the same function as device 3600-1.

Figure 4:
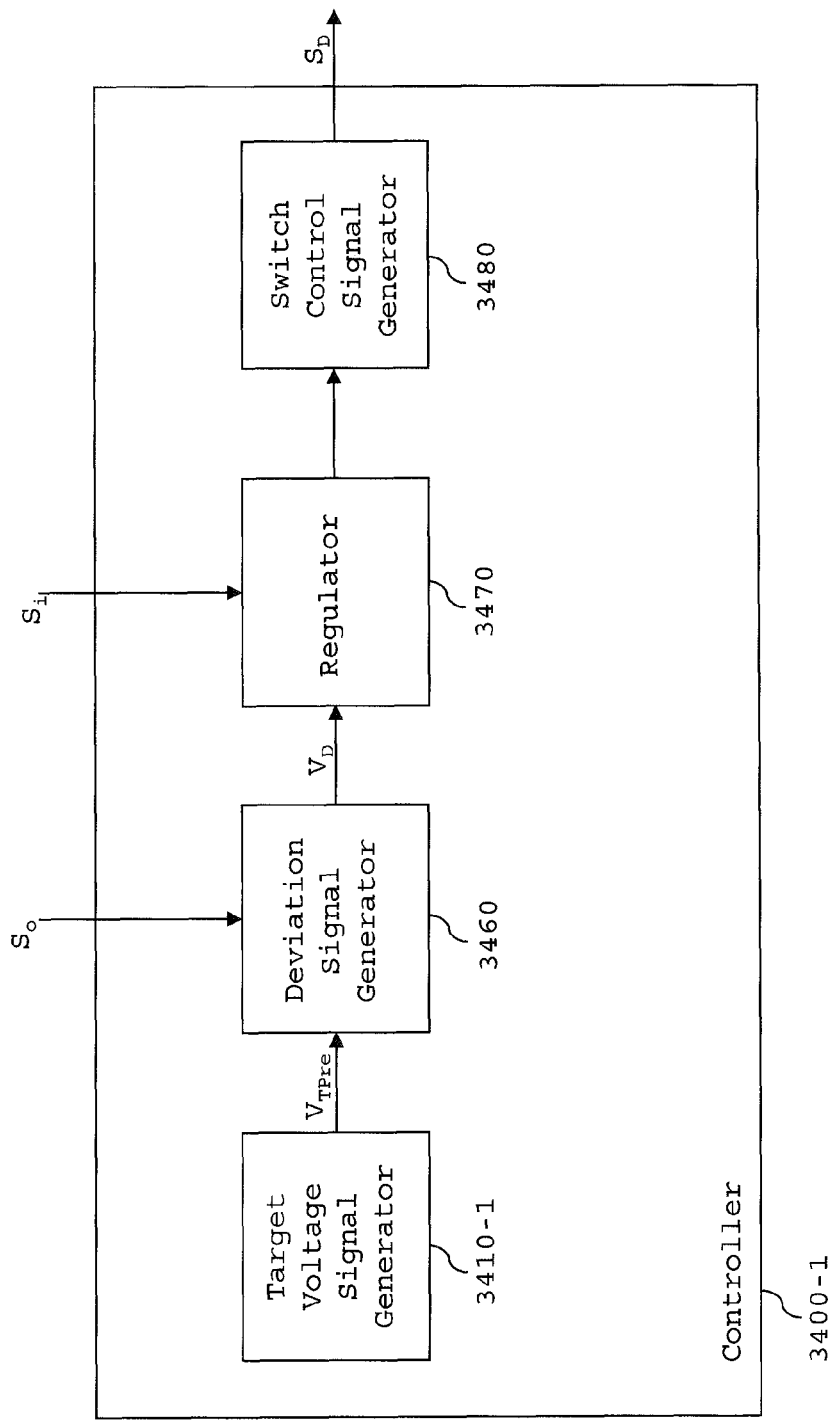
FIG. 4 shows further details of the controller in FIG. 3 according to a first embodiment.

FIG. 4 is a schematic block diagram showing further details of the controller 3400 of the present embodiment, hereinafter referred to as controller 3400-1. The controller 3400-1 comprises a target voltage signal generator 3410-1, a deviation signal generator 3460 and a switch control signal generator 3480. The controller 3400-1 may, as in the present embodiment, further comprise a regulator 3470.

The target voltage signal generator 3410-1 may be configured to generate a target voltage signal $V_T$ which is indicative of a target output voltage of the IBC 3000 in one of a number of different ways, as will be described in the following. However, in the present embodiment, the target voltage signal generator 3410-1 is operable to generate, as $V_T$, a predetermined target voltage signal, $V_{TPre}$, that is independent of the input voltage $V_{in}$. The size of $V_{TPre}$ may be set to a fixed value or may be made adjustable by the user of the IBC 3000. Accordingly, during operation, $V_{TPre}$ remains constant unless changed by the user.

The deviation signal generator 3460 is arranged to receive the feedback signal $S_O$, as well as the target voltage signal $V_T$ generated by the target voltage signal generator 3410-1, and is operable to generate a deviation signal, $V_D$, based on the target voltage signal $V_T$ and based on the feedback signal $S_O$. The deviation signal $V_D$ provides a measure of the deviation of the output voltage $V_{out}$ from the target output voltage.

The deviation signal $V_D$ is then fed into the regulator 3470 (or, in alternative embodiments where the regulator 3470 is not provided, into the switch control signal generator 3480). The regulator 3470 is configured to generate, in dependence upon the deviation signal $V_D$, a signal that defines a switching duty cycle which is used to control the switching elements in the primary side circuit 3100.

The regulator 3470 may provide more effective damping of voltage oscillations on the IVB 1400 by regulating the signal that defines a switching duty cycle. Improved regulation may be provided by the regulator 3470 being further arranged, as in the present embodiment, to receive the signal $S_i$ that is indicative of the input voltage $V_{in}$, and to generate the signal defining the switching duty cycle in dependence upon both the deviation signal $V_D$ and the signal $S_i$ that is indicative of the input voltage $V_{in}$. The regulator 3470 may also, as in the present embodiment, be further configured to adjust at least one control parameter in dependence upon the signal $S_i$, and to generate the signal defining the switching duty cycle in dependence upon the deviation signal $V_D$, the signal $S_i$ and the control parameter(s) adjusted in dependence on $S_i$.

The switch control signal generator 3480 is arranged to receive the signal defining the switching duty cycle output by the regulator 3470 (or the deviation signal $V_D$ in alternative embodiments, where the regulator 3470 is not provided). The switch control signal generator 3480 is operable to generate the required switch control signal $S_D$ to control the switching duty cycle of the switching element(s) in the primary side circuit 3100 in dependence upon the signal defining the switching duty cycle (or the deviation signal $V_D$, as the case may be).

Further details of the controller 3400-1 will now be described with reference to FIG. 5, which shows exemplary forms which the target voltage signal generator 3410-1, deviation signal generator 3460, regulator 3470 and switch control signal generator 3480 may take.

Figure 5:
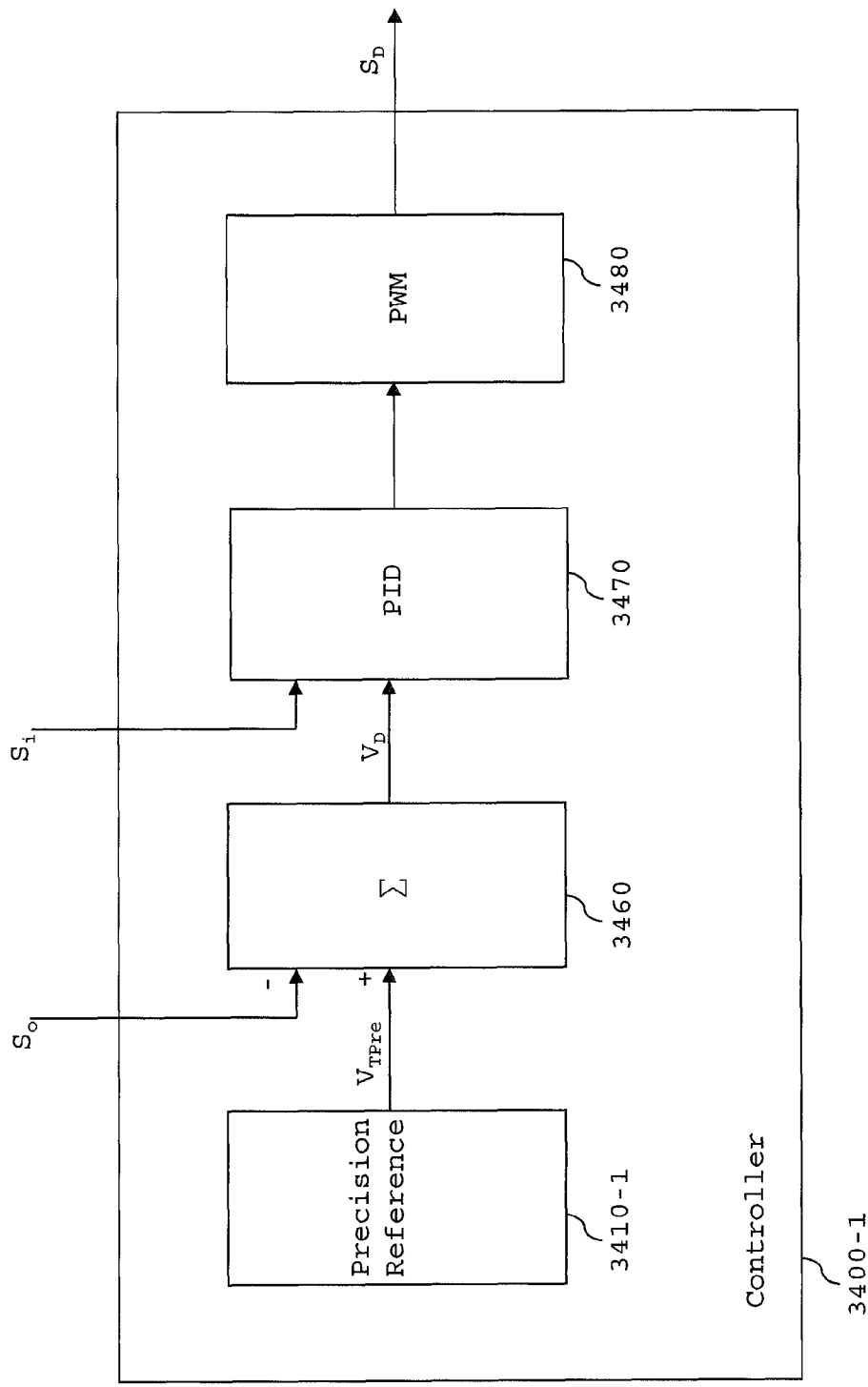
FIG. 5 shows exemplary forms which the components of the controller in FIG. 4 may take.

As shown in FIG. 5, in the present embodiment, the target voltage signal generator 3410-1 is provided in the form of a precision reference, which outputs a predetermined target voltage signal $V_{TPre}$ to the deviation signal generator 3460. The predetermined target voltage signal $V_{TPre}$ is kept independent of the input voltage $V_{in}$ which may allow the controller 3400-1 shown in FIG. 5 to keep the output voltage $V_{out}$ steady when there is a fluctuation in the input voltage $V_{in}$ of the IBC 3000.

The deviation signal generator 3460 in this embodiment takes the form of a difference calculator 3460, which compares the predetermined target voltage signal $V_{TPre}$ with the feedback signal $S_O$ which is indicative of the output voltage $V_{out}$ of the IBC 3000. More specifically, the deviation signal generator 3460 is arranged to generate the deviation signal $V_D$ by subtracting one of the feedback signal $S_O$ and the target voltage signal $V_T$ from the other of the feedback signal $S_O$ and the target voltage signal $V_T$ (i.e. by calculating $V_D = V_T - S_O$ or $V_D = S_O - V_T$).

The deviation signal $V_D$ is then fed into the regulator 3470, which, in the present embodiment, is provided in the form of a PID regulator 3470. The PID regulator 3470 is further arranged to receive a signal $S_i$ indicative of the input voltage $V_{in}$, and to use the signal $S_i$ to adjust at least one of the regulator's control parameters (in this example, at least one of P, I or D). The PID regulator 3470 generates a signal defining a switching duty cycle for the switching element(s) in dependence upon the deviation signal $V_D$ and the control parameters that are set in dependence on $S_i$. Feeding forward the signal $S_i$ to the PID regulator 3470 may allow the controller 3400-1 to keep the IBC output voltage $V_{out}$ in a steady state during rapid input voltage $V_{in}$ fluctuations.

The signal defining the switching duty cycle that has been generated by the PID regulator 3470 is then fed into the switch control signal generator 3480, which comprises a pulse width modulating (PWM) circuit 3480 that generates a pulse width modulated signal $S_D$ for controlling the switching element(s) in the primary side circuit 3100.

Figure 6:
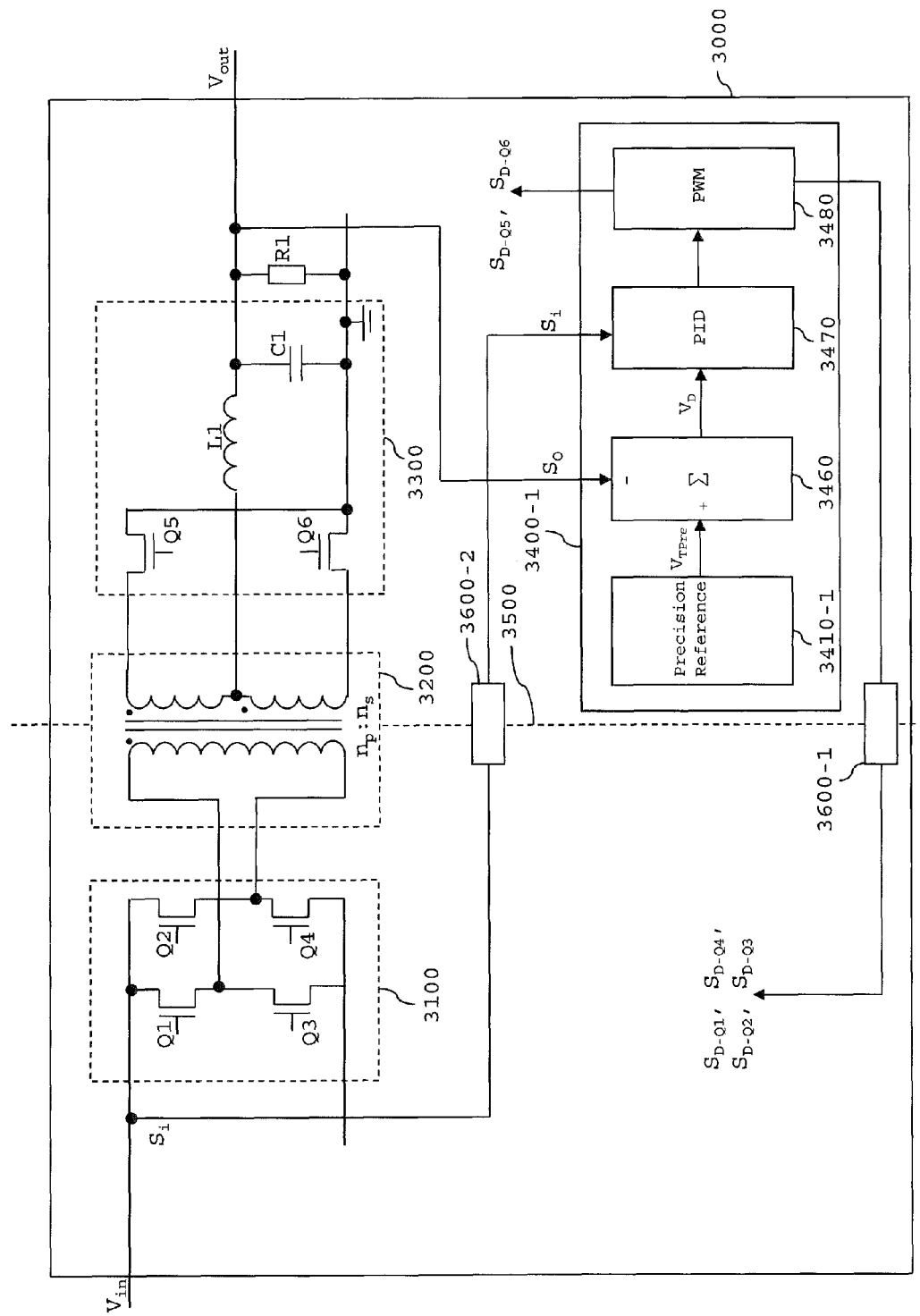
FIG. 6 shows further details of the IBC in FIG. 3.

FIG. 6 depicts the integration of the controller circuit 3400-1 described above with the other components of an IBC 3000. Operation of this IBC 3000 is achieved through control of six transistors, Q1 to Q6 (e.g. power MOSFETs). The primary side circuit 3100 comprises an H-bridge to generate an AC signal, formed from switching elements Q1 to Q4. Specifically, Q1 and Q4 will initially be switched ON and Q2 and Q3 switched OFF. This generates a positive-swinging signal across the primary coil of the voltage transformer 3200 thereby resulting is a change in flux. As a result, a voltage is induced across the secondary coil of the transformer 3200. Switching elements Q5 and Q6 form a rectifying circuit in the secondary side circuit 3300 and can be switched to provide rectification of the signal in the secondary coil. During this phase of the control cycle, Q6 is switched ON and Q5 switched OFF so as to rectify the signal. Similarly, the same is performed inversely to generate a negative-swinging signal, by turning Q1, Q4 and Q6 OFF and turning Q2, Q3 and Q5 ON to capture energy from the negative portion of the cycle.

As shown in FIG. 6, and as has been described above with reference to previous figures, the controller 3400-1 receives an input indicative of the output voltage $V_{out}$ of the IBC 3000, and preferably also the input voltage $V_{in}$. Based on these inputs, the controller 3400-1 generates various switch control signals $S_{D-Q1}$ to $S_{D-Q6}$ for controlling the switching elements Q1 to Q6 of the IBC 3000, as described below. In this case, the ground reference is at the secondary side 3300.

In the present embodiment, switch control signals $S_{D-Q1}$ to $S_{D-Q4}$ are transmitted across the isolation barrier 3500 via the device 3600-1. However, in alternative embodiments, each of the control signals may be transmitted across the isolation barrier 3500 via a respective device which performs the same function as device 3600-1.

Figure 7:
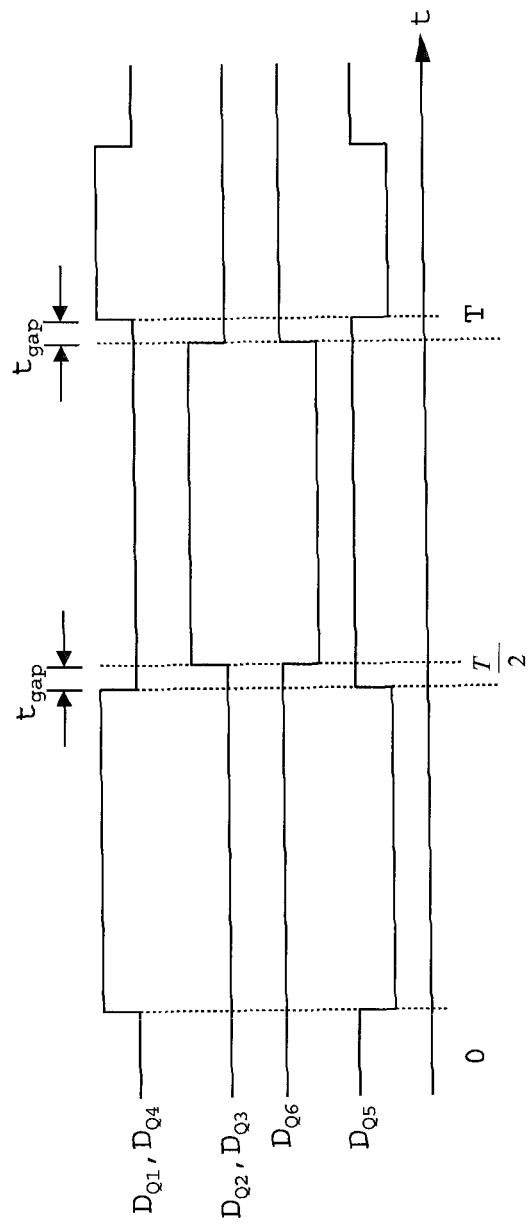
FIG. 7 is a timing diagram illustrating the control signals which the controller of FIG. 6 uses to control the switching elements in the IBC.

FIG. 7 depicts an exemplary timing diagram for the various switch control signals as output from the controller 3400-1 to control the switching duty cycle of the IBC 3000. The switch control signals relate to the switching elements of the IBC 3000, as depicted in FIG. 6.

As shown in FIG. 7, the control signals for Q1 and Q4 (labelled $S_{D-Q1}$ and $S_{D-Q4}$) closely match the inverse of the control signals for Q2 and Q3 (labelled $S_{D-Q2}$ and $S_{D-Q3}$). This generates alternate positive and negative voltage cycles on the primary side of the voltage transformer 3200, thereby inducing a voltage across the secondary side winding of the voltage transformer 3200.

FIG. 7 shows a small timing gap $t_{gap}$ between the end of the control signal for Q1 and Q4 and the start of the control signal for Q2 and Q3. As a result, the length of the 'ON-time' for Q1 and Q4 is substantially $T/2-t_{gap}$, where T is the length of a cycle. Similarly the 'ON-time' for Q2 and Q3 is also substantially $T/2-t_{gap}$. The controller 3400-1 controls the 'ON-time' to maintain good load regulation and transient response by controlling the size of the timing gap $t_{gap}$.

FIG. 7 also shows typical control signals for Q5 and Q6 (labelled $S_{D-Q5}$ and $S_{D-Q6}$). As shown, at the end of the first half 'ON period' for Q1 and Q4, Q5 is switched ON whilst Q6 is ON. This generates a conductive path to allow the discharging of inductor L1 into capacitor C1 and the load R. After this, Q6 is switched OFF and Q5 is left ON to perform rectification of the signal from the secondary side of the voltage transformer 3200.

Figure 8:
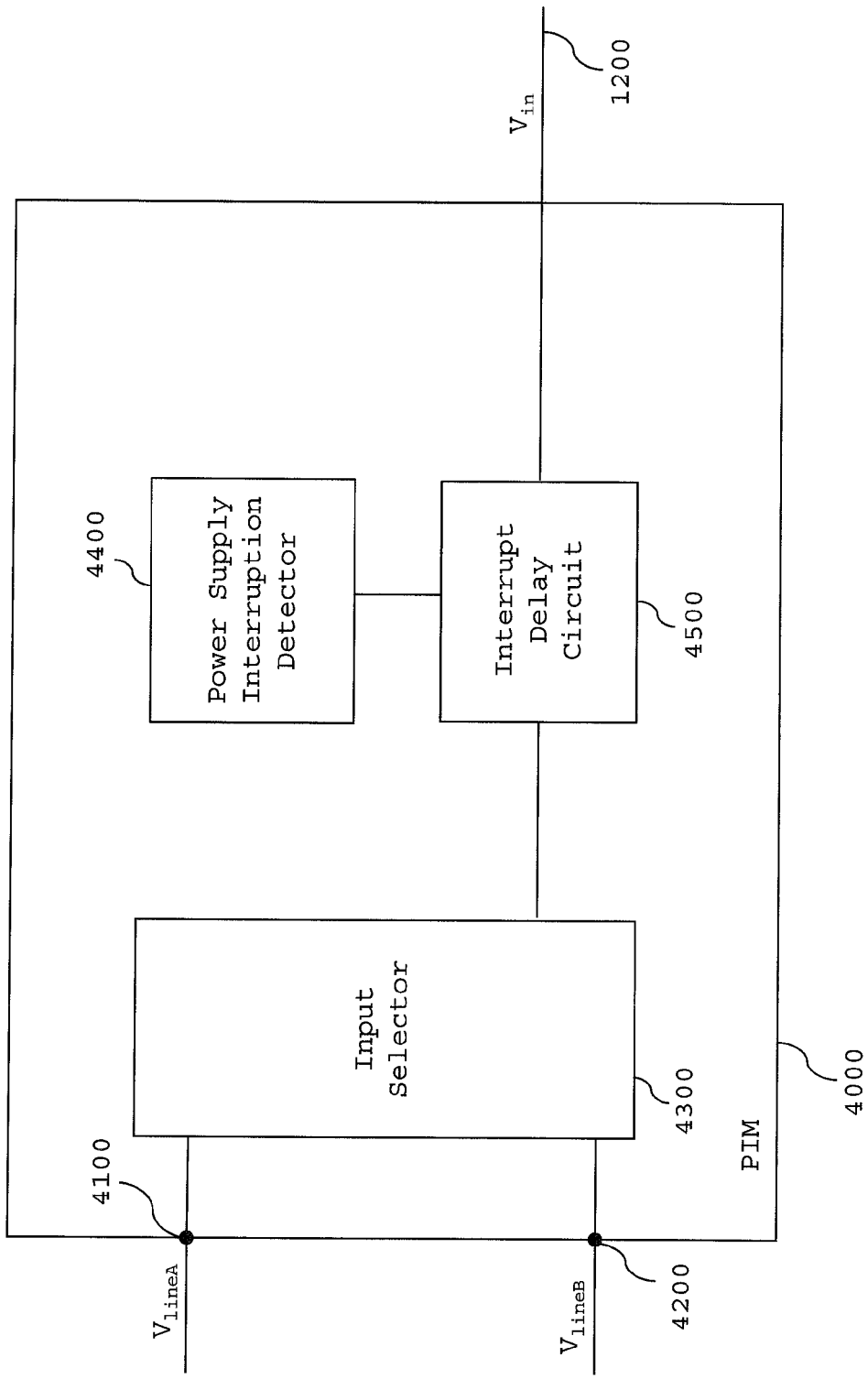
FIG. 8 provides a top-level illustration of components in the PIM shown in FIG. 2.

FIG. 8 is a block diagram providing a top-level illustration of components of the PIM 4000 of the present embodiment.

The PIM 4000 comprises a first input 4100 for receiving power from a first power source, a second input 4200 for receiving power from a second power source, an input selector 4300, a power supply interruption detector 4400 and an interrupt delay circuit 4500. Other components of the PIM 4000, such as an EMI filter that is usually provided to suppress the propagation of noise from the power sources into the remaining components of the IBA power supply system 2000, are not shown in FIG. 8 for clarity.

The input selector 4300 is operable to select, in dependence upon a first voltage, $V_{lineA}$, at the first input 4100 and a second voltage, $V_{lineB}$, at the second input 4200, at least one of the first input 4100 and second input 4200 from which the PIM 4000 is to draw power and generate the input voltage $V_{in}$ for the IBC 3000.

In the present embodiment, the power supply interruption detector 4400 is arranged to detect an interruption in the power drawn from the first input 4100 and second input 4200 of the PIM 4000 during operation.

The interrupt delay circuit 4500 comprises a delay capacitor which is charged with current from one or both of the first input 4100 and second input 4200 to a third voltage that is higher than $V_{lineA}$ and $V_{lineB}$. When the power supply interruption detector 4400 detects an interruption in the power delivered to the inputs of the PIM 4000, the interrupt delay circuit 4500 is operable to discharge the delay capacitor through the input of the IBC 3000. In this way, if the power sources supplying the PIM 4000 malfunction, the interrupt delay circuit 4500 starts to supply power to the downstream components of the IBA power supply system 2000, continuity in the power supplied to the downstream components may thus be ensured and may give these componenets extra time in which to shut down safely (before the delay capacitor discharges).

Further details of the PIM 4000 will now be described with reference to FIG. 9, which shows exemplary forms which the input selector 4300, power supply interruption detector 4400 and interrupt delay circuit 4500 may take.

Figure 9:
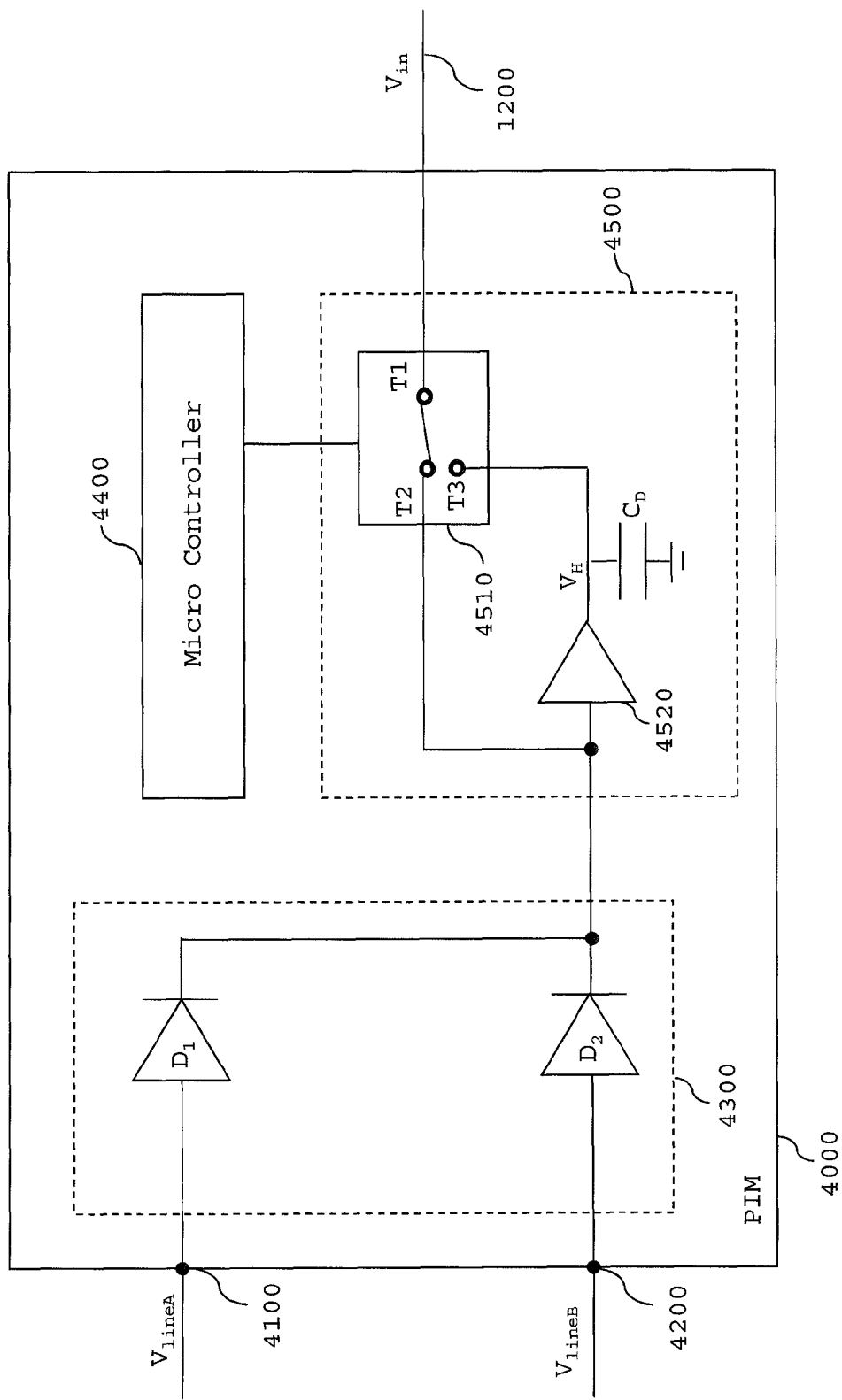
FIG. 9 shows further details of the PIM in FIG. 8.

As shown in FIG. 9, in the present embodiment, the input selector 4300 is provided in the form of a diode network having two diodes, $D_1$ and $D_2$, which are arranged as shown in FIG. 9, such that the anode of $D_1$ connects to the first input 4100, the anode of $D_2$ connects to the second input 4200, and the cathodes of both diodes are connected together to provide the input to the interrupt delay circuit 4500. This configuration performs OR-ing between the first and second power sources, with power from the input to the PIM 4000 at the higher voltage being preferentially supplied to the interrupt delay circuit 4500. In alternative embodiments, other types of switching elements, such as MOSFETs or other active switching elements, may be used in place of diodes to increase efficiency.

The power supply interruption detector 4400 takes the exemplary form of a microcontroller 4400 in the present embodiment. The microcontroller 4400 monitors the first input 4100 and the second input 4200, and generates an interrupt signal when an interruption in power is detected at both of the inputs.

In the present embodiment, the interrupt delay circuit 4500 comprises a switch 4510, a voltage amplifier 4520, and a delay capacitor $C_D$. The switch 4510 is provided in the exemplary form of a single pole, double throw switch with terminals T1, T2, and T3, and is arranged such that the output of the diode network 4300 connects to terminal T2, the power bus 1200 connects to terminal T1 and the output of the voltage amplifier 4520 (and ungrounded side of the capacitor $C_D$) connects to the terminal T3. The microcontroller 4400 is operable to control the switch 4510 via the interrupt signal generated thereby when an interruption in power is detected at both of the inputs, such that the switch 4510 connects terminals T1 and T3. On the other hand, when the interrupt signal is not being generated by the microcontroller 4400, the switch 4510 connects terminals T1 and T2. The effect of this is that power is supplied to the IBC 3000 by the PIM 4000 via one of the first or second power sources when the power sources are operating normally and, when the power sources supplying the IBA power supply system 2000 malfunction, the PIM 4000 begins to supply power to the downstream components of the IBC 3000 in order to compensate for the interruption in power delivery from the power sources. This may allow extra time for the PIM's downstream components to shut down safely, and may thereby prevent potential damage to the IBA power supply system 2000 or the loads 1600-1 to 1600-K. The length of time for which the delay capacitor $C_D$ can continue to supply power to the IBC 3000 is referred to as the hold-up time $T_H$.

The voltage amplifier 4520 is connected between the cathodes of the diode network 4300 and a first terminal of the delay capacitor $C_D$. The first terminal of the delay capacitor $C_D$ is further connected to the terminal T3 of the switch 4510, and the second terminal of the delay capacitor $C_D$ is connected to ground. In the present embodiment, the voltage amplifier 4520 is a boost amplifier and is arranged to charge the delay capacitor $C_D$ to a hold-up voltage, $V_H$, which is higher than both $V_{lineA}$ and $V_{lineB}$. Conventionally, the delay capacitor $C_D$ would be charged to a voltage that is equal to the higher of $V_{lineA}$ and $V_{lineB}$. However, by raising the voltage to which the delay capacitor $C_D$ is charged to a voltage higher than $V_{lineA}$ and $V_{lineB}$, the delay capacitor $C_D$ can store significantly more energy, which may allow the hold-up time $T_H$ to be significantly increased.

However, if the hold-up voltage $V_H$ is made greater than both $V_{lineA}$ and $V_{lineB}$, switching in the delay capacitor $C_D$ when an interruption in power delivery occurs may cause a rapid change in the input voltage $V_{in}$ of the IBC 3000. As explained above, in conventional IBA power supply systems, this voltage fluctuation would be transmitted through the IBC and cause damage to the POL regulators 1500-1 to 1500-K or loads 1600-1 to 1600-K, or cause the system to shut down. However, in an IBA power supply system 2000 of the present embodiment, such voltage fluctuations on the IVB 1400 may be suppressed by the voltage regulation that is provided by the IBC 3000. A higher hold-up voltage $V_H$ may therefore be used, and a longer hold-up time $T_H$ may be achieved, meaning that more time may be provided for the downstream components of the IBA power supply system 2000 to shut down safely, without the risk of them sustaining damage or unnecessarily activating their protection circuits.

Second Embodiment

An IBA power supply system 2000 according to a second embodiment of the present invention will now be described with reference to FIGS. 10 to 16. The IBA power supply system 2000 of the second embodiment has many components in common with the first embodiment described above, and these common components will not be described again here. However, the IBA power supply system 2000 of the present embodiment differs from the first embodiment by the configuration of the controller 3400 that forms part of the IBC 3000, this controller, hereinafter referred to as controller 3400-2, will now be described.

Figure 10:
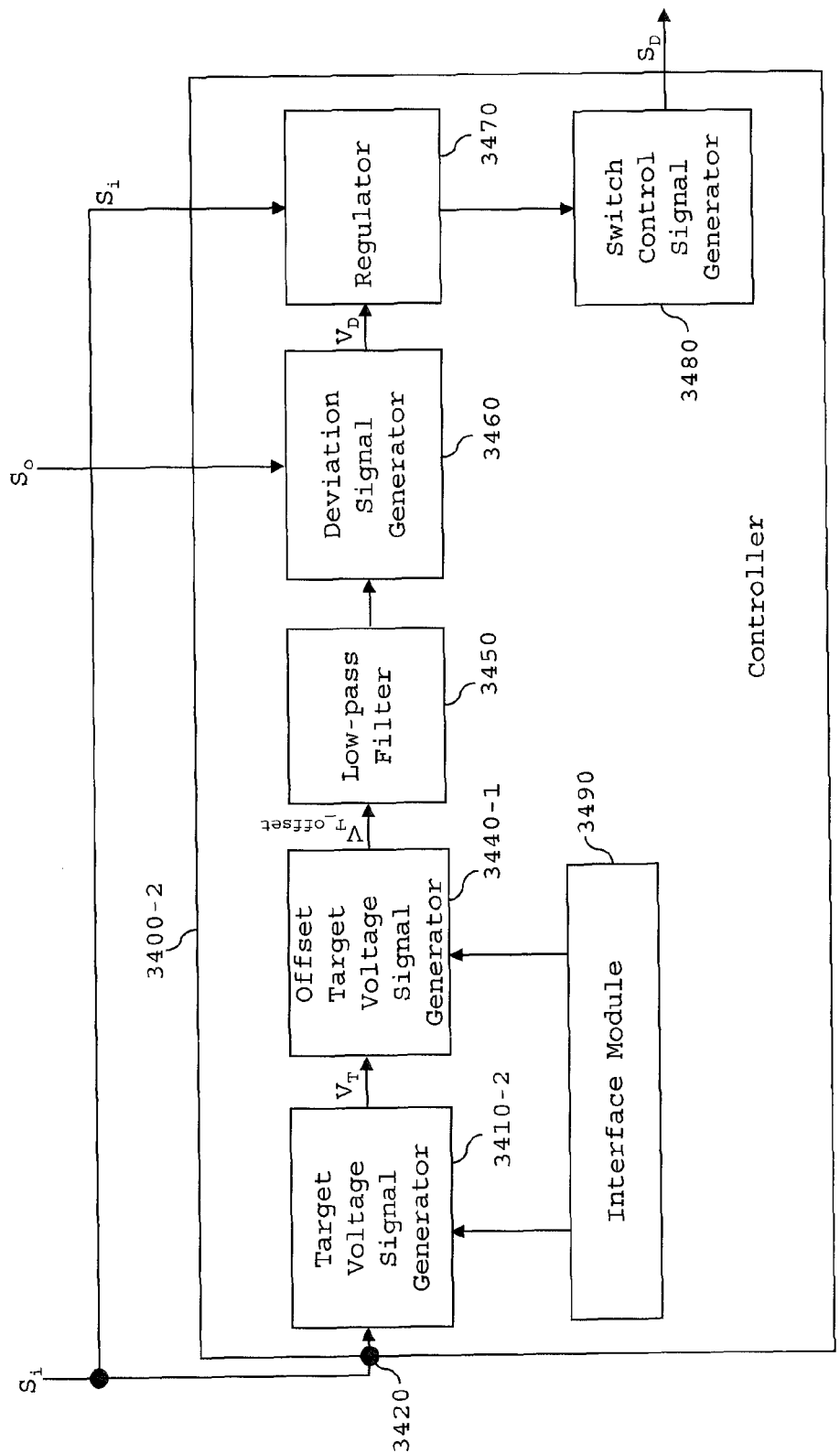
FIG. 10 is a schematic showing components of an IBC controller that forms part of an IBA power supply system according to a second embodiment of the present invention.

As can be appreciated from a comparison of FIGS. 4 and 10, the controllers 3400-1 and 3400-2 of the first and second embodiments have many features in common, and the description of the structure and functionality of these common components will therefore not be repeated. However, the controller 3400-2 of the present embodiment has additional components, as well as a target voltage signal generator 3410-2 that differs from the target voltage signal generator 3410-1 of the first embodiment, and the structure and operation of these additional components, and also of the target voltage signal generator 3410-2, will now be described in detail.

In addition to the target voltage signal generator 3410-2, the controller 3400-2 comprises an input terminal 3420. The controller 3400-2 may, as in the present embodiment, further comprise an offset target voltage signal generator 3440-1, a low-pass filter 3450, and an interface module 3490 via which settings of the target voltage signal generator 3410-2 and offset target voltage signal generator 3440-1 (if included) may be adjusted as described below.

The target voltage signal generator 3410-2 of the present embodiment is arranged to receive the signal $S_i$ via the input terminal 3420, and is operable to generate a variable target voltage signal $V_T$ which is dependent upon the input voltage $V_{in}$. More particularly, the target voltage signal generator 3410-2 is arranged to generate the target voltage signal $V_T$ as a function of the input voltage $V_{in}$. This function, herein denoted $f(V_{in})$, can be changed by the target voltage signal generator 3410-2 according to user instructions that may be communicated via the interface module 3490.

The function, $f(V_{in})$ may, for example, be a linear function, with the target voltage signal generator 3410-2 generating the variable target voltage signal $V_T$ by multiplying the received signal $S_i$ by a scaling factor. The function $f(V_{in})$ may alternatively be a non-linear function of the received signal $S_i$, e.g. a quadratic or a higher-order polynomial function, and it may have one or more discontinuities. The function $f(V_{in})$ may also be defined piece-wise for two or more working regions of the input voltage $V_{in}$. In general, the target voltage signal generator 3410-2 may generate the target voltage signal $V_T$ as any function of the input voltage $V_{in}$ which is such that the target voltage signal $V_T$ is zero when the input voltage $V_{in}$ is zero (in other words, a function whose plot passes through the origin).

The offset target voltage signal generator 3440-1 is operable to generate an offset target voltage signal, $V_{T\_offset}$ by combining the target voltage signal $V_T$ generated by the target voltage signal generator 3410-2 with an offset signal, $V_{offset}$, the offset signal $V_{offset}$ being independent of the input voltage $V_{in}$.

It should be noted that the functions of the target voltage signal generator 3410-2 and the offset target voltage signal generator 3440-1 may be combined into a single component of the controller 3400-2, which generates, in a single step, an offset target voltage signal $V_{T\_offset}$ in the form of a voltage that is offset in relation to the input voltage $V_{in}$, the size of the offset being independent of $V_{in}$.

As noted above, the offset signal $V_{offset}$ is not dependent on the input voltage $V_{in}$ and may be generated by the offset target voltage signal generator 3440-1 itself, as in the present embodiment, or it may be generated externally of the controller 3400-2 and received by the offset target voltage signal generator 3440-1. In either case, the offset target voltage signal generator 3440-1 combines the target voltage signal $V_T$ with the offset signal $V_{offset}$, for example by adding these signals together, as in the present embodiment.

The low-pass filter 3450 may be any suitable type of low-pass filter for low-pass filtering a signal to remove higher-frequency components thereof. The low-pass filter 3450 may be a digital filter or it may be implemented in the analog domain, for example as a simple first-order RC filter or a more complex filter network, in accordance with requirements.

Figure 11:
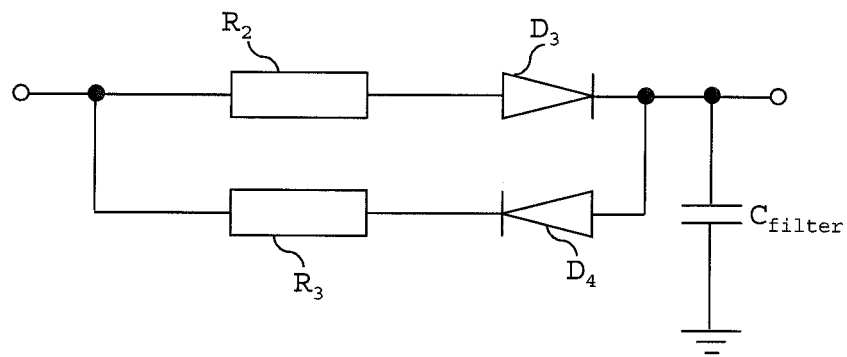
FIG. 11 shows an exemplary configuration of the low-pass filter in FIG. 10.

The low-pass filter 3450 may, as in the present embodiment, be arranged to respond to an increase in the input voltage $V_{in}$ of the IBC 3000 with a first time constant, and to a decrease in the input voltage $V_{in}$ of the IBC 3000 with a second time constant that is different from the first time constant. Effective noise suppression may be achieved by setting the first time constant to a value which is preferably no smaller than that of the output filter time constant. The value of the first time constant will depend on the allowed inrush current level and the output capacitance, but will in many practical applications be within the range from 0.3 ms to 3 ms. The second time constant may, for example, be within the range from 60 microseconds to 0.6 ms. Such a low-pass filter 3450 may be implemented as shown in FIG. 11, using two resistors $R_2$ and $R_3$ and two diodes $D_3$ and $D_4$, which are connected to a filter capacitor $C_{filter}$ in the manner shown.

The two time constants are preferably user-adjustable, so that the user can adjust them in accordance with the capacitance of IVB 1400 connected to the output of the IBC 3000 in order to maintain the size of the charge and discharge currents of the capacitance within respective predetermined ranges of values. In an analog implementation, the time constants may be made user-adjustable e.g. by using variable resistors and/or capacitor in the filter circuit. A low-pass filter having the same time constant for rising/falling input signals may similarly be made to allow the time constant to be adjusted by the user.

Referring again to FIG. 10, as in the first embodiment, the deviation signal generator 3460 is arranged to receive the signal $S_O$ indicative of the output voltage $V_{out}$ of the IBC 3000, as well as the offset target voltage signal $V_{T\_offset}$, which has been generated by the offset target voltage signal generator 3440-1 and filtered by the low-pass filter 3450. The deviation signal generator 3460 is operable to generate the deviation signal $V_D$ based on the filtered offset target voltage signal $V_{T\_offset}$ (or, if the low-pass filter 3450 is omitted, the offset target voltage signal $V_{T\_offset}$) and based on the output voltage $V_{out}$. The deviation signal $V_D$ generated by the deviation signal generator 3460 is then processed in the same manner as in the first embodiment to produce the switch control signal $S_D$.

Further details of the controller 3400-2 will now be described with reference to FIG. 12, which shows exemplary forms which the components shown in FIG. 10 may take. In particular, FIG. 12 illustrates an exemplary configuration of the offset target voltage signal generator 3440-1 that enables it to generate an offset target voltage signal $V_{T\_offset}$, as well as exemplary implementations of the target voltage signal generator 3410-2, deviation signal generator 3460, regulator 3470 and switch control signal generator 3480.

Figure 12:
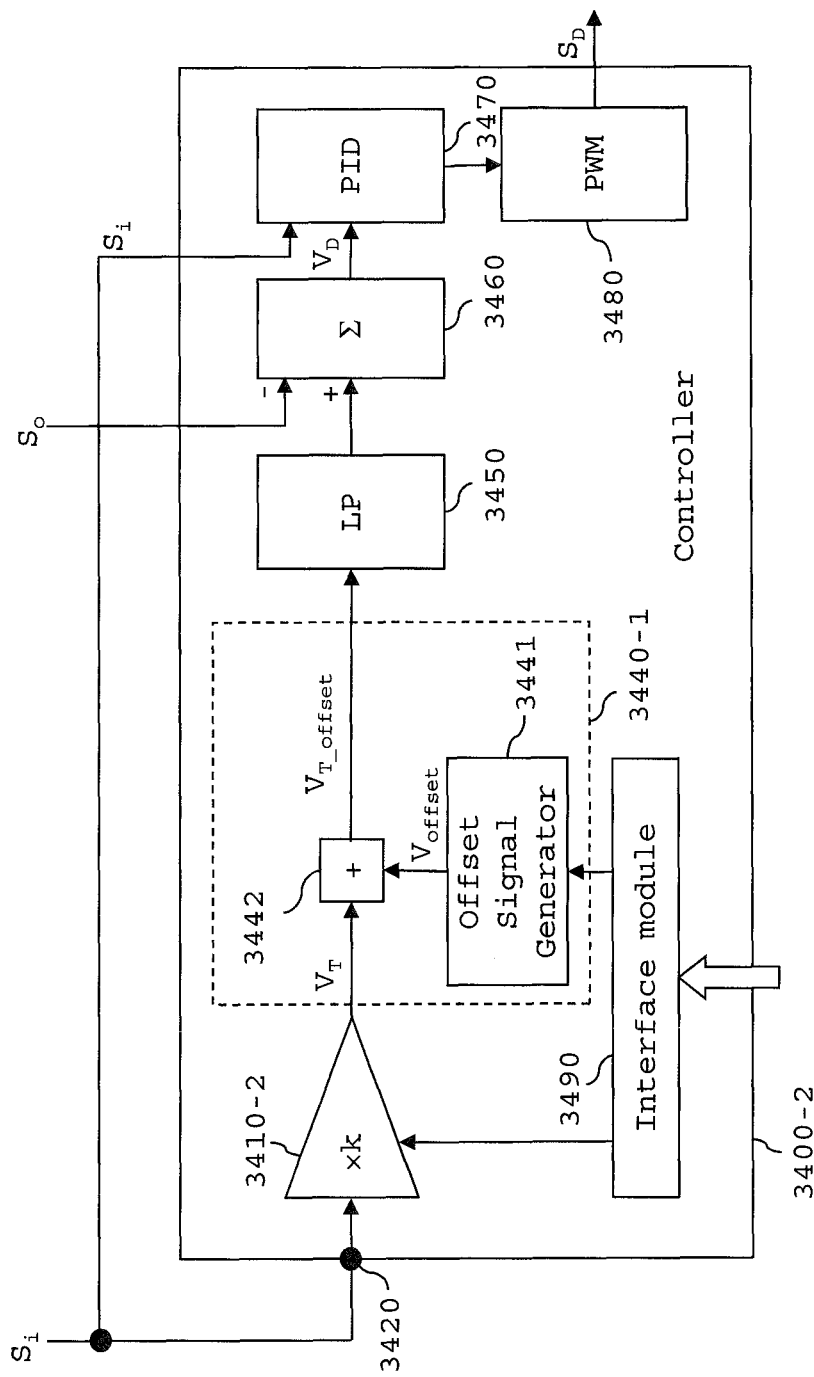
FIG. 12 shows exemplary forms which the components of the controller in FIG. 10 may take.

As shown in FIG. 12, the target voltage signal generator 3410-2 is configured to implement a multiplication function, specifically to multiply the received signal $S_i$ indicative of the IBC 3000 input voltage $V_{in}$ by a scaling factor k, which may be set equal to the product of a transformer turns ratio n (where $n=n_s/n_p$ and $n_s$ is the number of turns on the secondary winding of the voltage transformer 3200, and $n_p$ is the number of turns on the primary winding of the voltage transformer 3200) and a nominal switching duty cycle ratio, $D_{nom}$, of the switching elements in the primary side circuit 3100.

Therefore, the variable target voltage signal $V_T$ is generated by multiplying the input voltage $V_{in}$ of the IBC 3000 (derived from the signal $S_O$) by the scaling factor k, in accordance with the following equation.

$$V_T = kV_{in} \qquad \text{Equation 1}$$

Moreover, in the present embodiment, the target voltage signal generator 3410-2 is configured to allow the scaling factor k to be set by the user. More particularly, the target voltage signal generator 3410-2 is configured to receive from the interface module 3490 a signal indicative of an input from the user, which may be provided by the user entering his selection, adjustment or setting of the scaling factor k via an input device such as a key pad or touch screen. The target voltage signal generator 3410-2 is arranged to set the factor k in dependence upon the received signal that is indicative of the user's input. However, it should be noted that, more generally, the target voltage signal generator 3410-2 may be arranged to set, in dependence upon the received signal, one or more parameters of the above-mentioned function $f(V_{in})$ which relates the target voltage signal $V_T$ to the input voltage $V_{in}$, which function need not be linear in $V_{in}$.

As shown in FIG. 12, in the present embodiment, the offset target voltage signal generator 3440-1 comprises an offset signal generator 3441 operable to generate a variable offset signal $V_{offset}$, and an adder 3442 which is arranged to add the target voltage signal $V_T$ and the variable offset signal $V_{offset}$ received thereby, and output the result of summing these signals to the low-pass filter 3450 as an offset target voltage signal $V_{T\_offset}$.

In more detail, the offset signal generator 3441 is arranged to receive a signal from the interface module 3490 and to generate the variable offset signal $V_{offset}$ using the received signal, for example by amplifying and/or filtering, or otherwise processing the received signal. Thus, the offset signal $V_{offset}$ is a function of the received signal, although it is independent of the IBC's input voltage $V_{in}$. Depending on the requirements of the specific IBC implementation, the offset signal generator 3441 may alternatively be configured to relay the signal received from the interface module 3490 (or directly from a signal source external to the controller 3400-2) to the adder 3442 without processing it.

More specifically, in the present embodiment, the offset signal generator 3441 is arranged to receive a signal indicative of an input from a user via the interface module 3490, and to generate the offset signal $V_{offset}$ in dependence on the signal that is indicative of the user's input. For example, the interface module 3490 may be configured to provide an interface between the controller 3400-2 and an input device such as a key pad or touch screen, via which the user can enter an amount of target voltage offset which the offset signal generator 3441 is to generate during operation of the controller 3400-2.

The usefulness of the user being able to specify the amount of target voltage offset to be applied will now be explained with reference to FIGS. 13 and 14.

Figure 13:
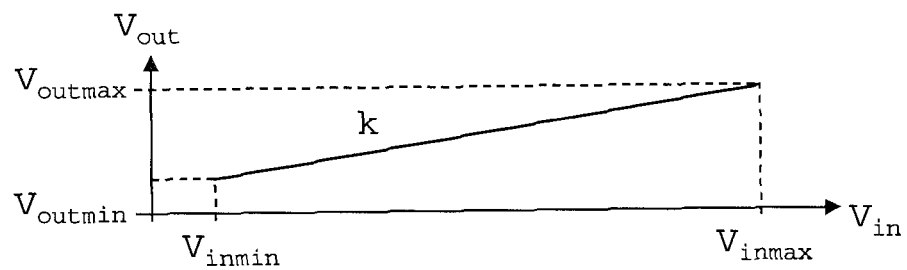
FIG. 13 illustrates the variation of the IBC output voltage as a function of the input voltage when controlled with the controller in FIG. 12.
Figure 14:
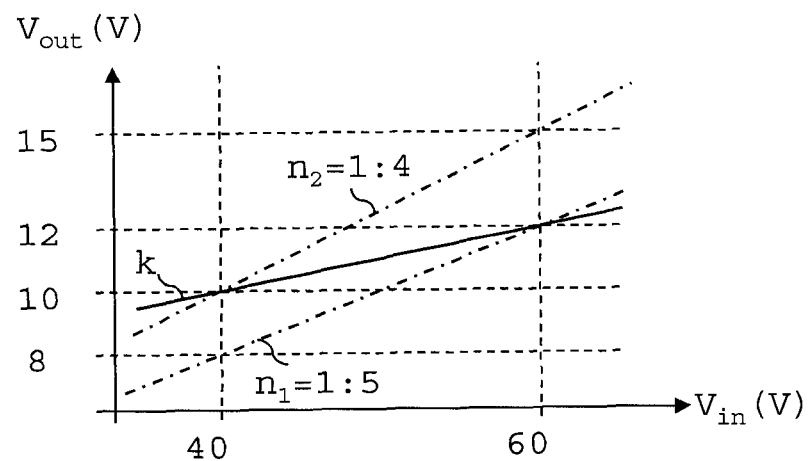
FIG. 14 illustrates the variation of the IBC output voltage as a function of the input voltage for two exemplary fixed transformer ratios, together with a variation generated by the offset target voltage signal generator in FIG. 12.

FIG. 13 illustrates a linear variation of the IBC output voltage $V_{out}$ as a function of the input voltage $V_{in}$. The gradient k of the line shown in FIG. 13 is given by $(V_{outmax}-V_{outmin})/(V_{inmax}-V_{inmin})$, where $V_{outmax}$, $V_{outmin}$, $V_{inmax}$ and $V_{inmin}$ define the ends of the input and output voltage ranges of the IBC 3000, as illustrated. By the user being able to choose the value of k (either by making the value of k adjustable in the manner described above, or by configuring the target voltage signal generator 3410-2 at the time of manufacture to perform its operation using a particular value of k), the IBC 3000 may be made to simulate a transformer turns ratio that is different to the one actually present in the voltage transformer 3200 of the IBC 3000. In addition, by adding an offset to the target output voltage $V_T$, the user may be able to set up the IBC 3000 to operate with the desired voltage conversion characteristic across any desired range of voltages. Thus, the offset target voltage signal $V_{T\_offset}$ obtained by combining the offset signal $V_{offset}$ with the target voltage signal $V_T$ generated by the target voltage signal generator 3410-2, may be expressed more generally as follows:

$$V_{T\_offset} = kV_{in} + V_{offset} \qquad \text{Equation 2}$$

The ability to define any desired linear relation between the offset target voltage signal $V_{T\_offset}$ and the input voltage $V_{in}$ may allow the user to secure the advantages of achieving higher output voltages at lower input voltage $V_{in}$ values whilst limiting the size of the output voltage $V_{out}$ at higher input voltage $V_{in}$ values. Thus, is may become possible to obtain an increased output power level, or a lower output current, at lower input voltages. In other words, by being able to adjust the offset signal $V_{offset}$, the user may be able to adjust the controller 3400-2 to control the IBC 3000 to operate across desired voltage ranges as if it had an input voltage-dependent transformer turns ratio. The usefulness of being able to make these adjustments will now be explained by way of a design example.

The IBC of the design example is a DC-DC step-down converter which has an input voltage $V_{in}$ range of 40-60 V and a desired output voltage $V_{out}$ range of 10-12 V. Using fixed transformer ratios of $n_1=1:5$ and $n_2=1:4$ yields the dashed lines shown in FIG. 14. As is evident from these plots in FIG. 14, neither of the fixed transformer ratios $n_1$ and $n_2$ allows the converter to output voltages in the desired range of 10-12 V for input voltages between 40 and 60 V.

However voltage conversion within the desired voltage ranges may be achieved by setting k and the offset voltage $V_{offset}$ to appropriate values. More specifically, the value of k may be set according to $k=(v_{outmax}-V_{outmin})/(V_{inmax}-V_{inmin})$, which in the present example yields $k=(12-10)/(60-40)=0.1$. The offset voltage $V_{offset}$, on the other hand, is given by the following expression:

$$V_{offset} = \frac{(V_{in\,max}V_{out\,min} - V_{out\,max}V_{in\,min})}{(V_{in\,max} - V_{in\,min})} \qquad \text{Equation 3}$$

In the present design example, $V_{offset}$ is calculated according to Eqn. 3 to be 6 V.

The transformer turns ratio $n_s:n_p$ to be used in the voltage transformer 3200 of the design example is required to satisfy the following condition:

$$\frac{n_s}{n_p} \geq k + \frac{V_{offset}}{V_{in\,min}} \qquad \text{Equation 4}$$

In other words, the voltage across the secondary coil of the voltage transformer 3200 should be larger than the output voltage $V_{out}$, over the whole working input voltage $V_{in}$ range. Thus, in the present design example, the transformer turns ratio is required to be greater than or equal to 0.25.

The offset signal generator 3441 may additionally or alternatively be arranged to receive a signal indicative of a measured temperature of a component (e.g. the voltage transformer 3200) of the IBC 3000 via the interface module 3490, and generate the offset signal $V_{offset}$ in dependence upon the received signal that is indicative of the measured temperature.

This may allow the offset signal generator 3441 to maintain efficient and stable operation when the temperature of the IBC 3000 changes.

Alternatively, the offset signal generator 3441 of the present embodiment may additionally or alternatively be arranged to receive via the interface module 3490 a signal indicative of an output load of the IBC 3000, and to generate the offset signal $V_{offset}$ in dependence upon the received signal that is indicative of the output load. The provision of such a load-dependent offset may advantageously allow the output voltage $V_{out}$ of the IBC 3000 to be tuneable so as to reduce transmission losses between the IBC 3000 and its load, the POL regulators 1500-1 to 1500-K. The offset $V_{offset}$, and hence $V_{out}$ could be adjusted so as to optimize the system efficiency for the prevailing load level. The reader is referred to WO2012/007055 for further details of this scheme for optimizing the efficiency of an IBA power supply system.

Referring again to FIG. 12, the low-pass filter 3450 is preferably provided to limit the slew rate of the IBC 3000 output voltage $V_{out}$ change when the input voltage $V_{in}$ changes, and thus the accompanying change in the IBC's load current. It may therefore be effective in suppressing load current transients that would otherwise occur in response to input voltage $V_{in}$ fluctuations, and may also suppress noise in both the power bus 1200 and IVB 1400.

In summary, it will be understood from the description of the second embodiment above that the controller 3400-2 introduces load regulation into an otherwise fixed ratio converter. Instead of using a fixed switching duty cycle, the switching duty cycle can be varied according to the load requirements and according to the input voltage $V_{in}$ of the IBC 3000. This is achieved using both the input voltage $V_{in}$ and the output voltage $V_{out}$ to generate the switch control signal $S_D$. This may improve the damping of oscillations on the output due to input voltage $V_{in}$ fluctuations, while maintaining the switching duty cycle near to 100%, for maximum efficiency. Furthermore, low-pass filtering the target voltage signal and feeding forward the signal $S_t$ into the regulator 3470 may significantly reduce inrush currents as the target voltage changes slowly in response to input voltage $V_{in}$ fluctuations.

In order to maintain good load regulation and transient response a design margin for the nominal switching duty cycle $D_{nom}$ has to be introduced. Simulations and measurements performed by the present inventors show that the margin need only be small with $D_{nom}$ typically taking a value between 80-95% depending on the IBC implementation. Hence, the power efficiency of an embodiment is almost at maximum and not reduced much compared with a fixed radio converter, but the embodiment may additionally provide improved transient response and load regulation.

It should be noted that, because the switching duty cycle of an embodiment is controlled near the natural border of 100%, methods should be employed to avoid integral wind-up. For example, well-known saturation circuitry of the integral value can be used to address this issue.

Figure 15:
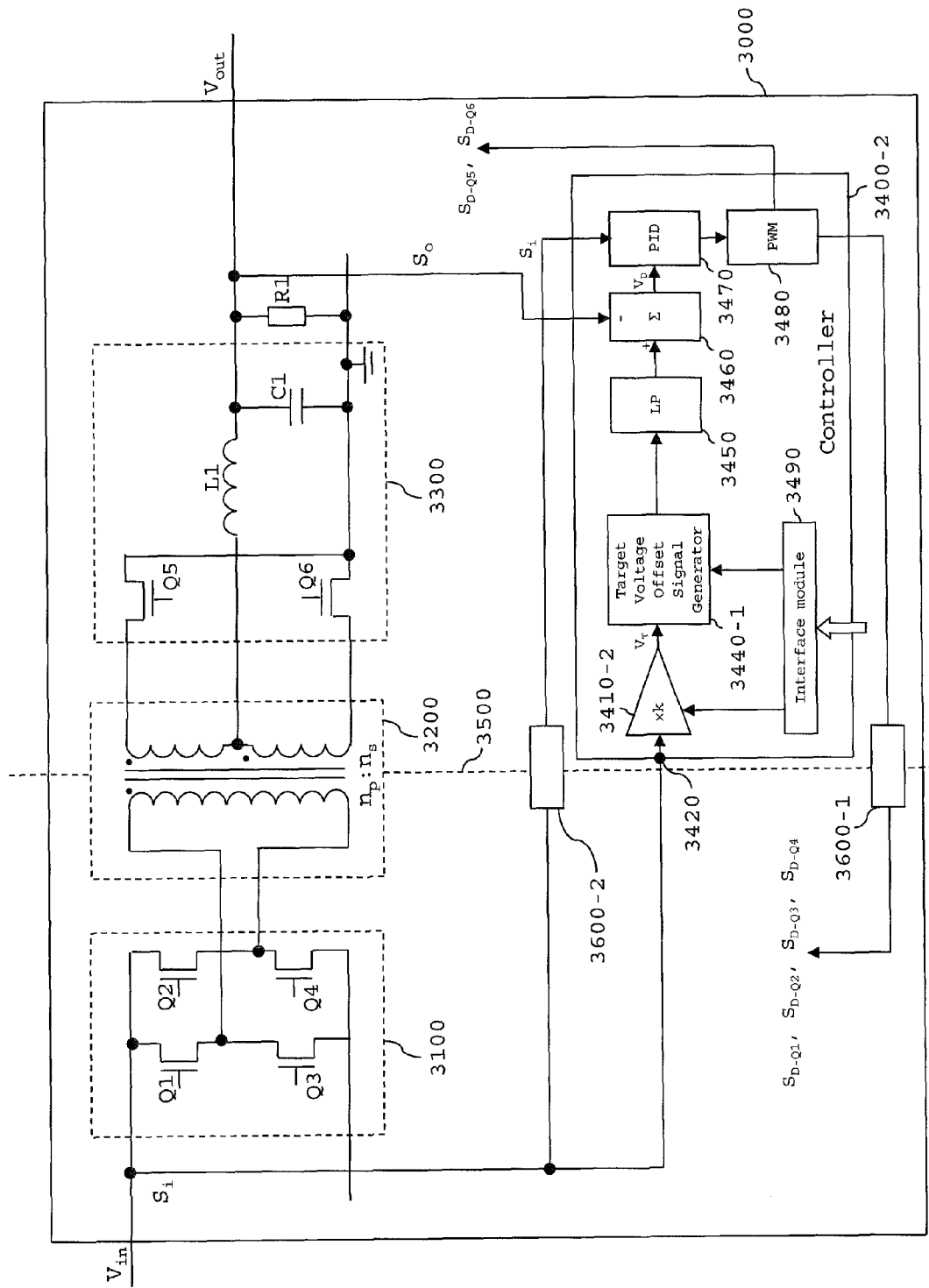
FIG. 15 shows further details of the IBC forming part of the IBA power supply system of the second embodiment.

FIG. 15 depicts the integration of the controller 3400-2 described above with the other components of the IBC 3000 in the embodiment.

The components shown in FIG. 15 and their interactions are the same as those with like numerals described above with reference to FIG. 6. The IBC 3000 shown in FIG. 15 differs from that in FIG. 6 in the manner in which the target voltage signal $V_T$ is generated. In the present embodiment, this signal is a function of the input voltage $V_{in}$, which has been offset and filtered, causing the output voltage $V_{out}$ to be dependent on $V_{in}$. This is in contrast to the first embodiment, where $V_{out}$ is independent of $V_{in}$.

Third Embodiment

An IBA power supply system according to a third embodiment of the present invention will now be described with reference to FIGS. 16 to 21. The IBA power supply system of the third embodiment has many components in common with that of the second embodiment described above, and these common components will not be described again here. However, the IBA power supply system of the present embodiment differs from the second embodiment by the configuration of the controller 3400 that forms part of the IBC 3000. The controller of the present embodiment is referred to as controller 3400-3 and will now be described.

Figure 16:
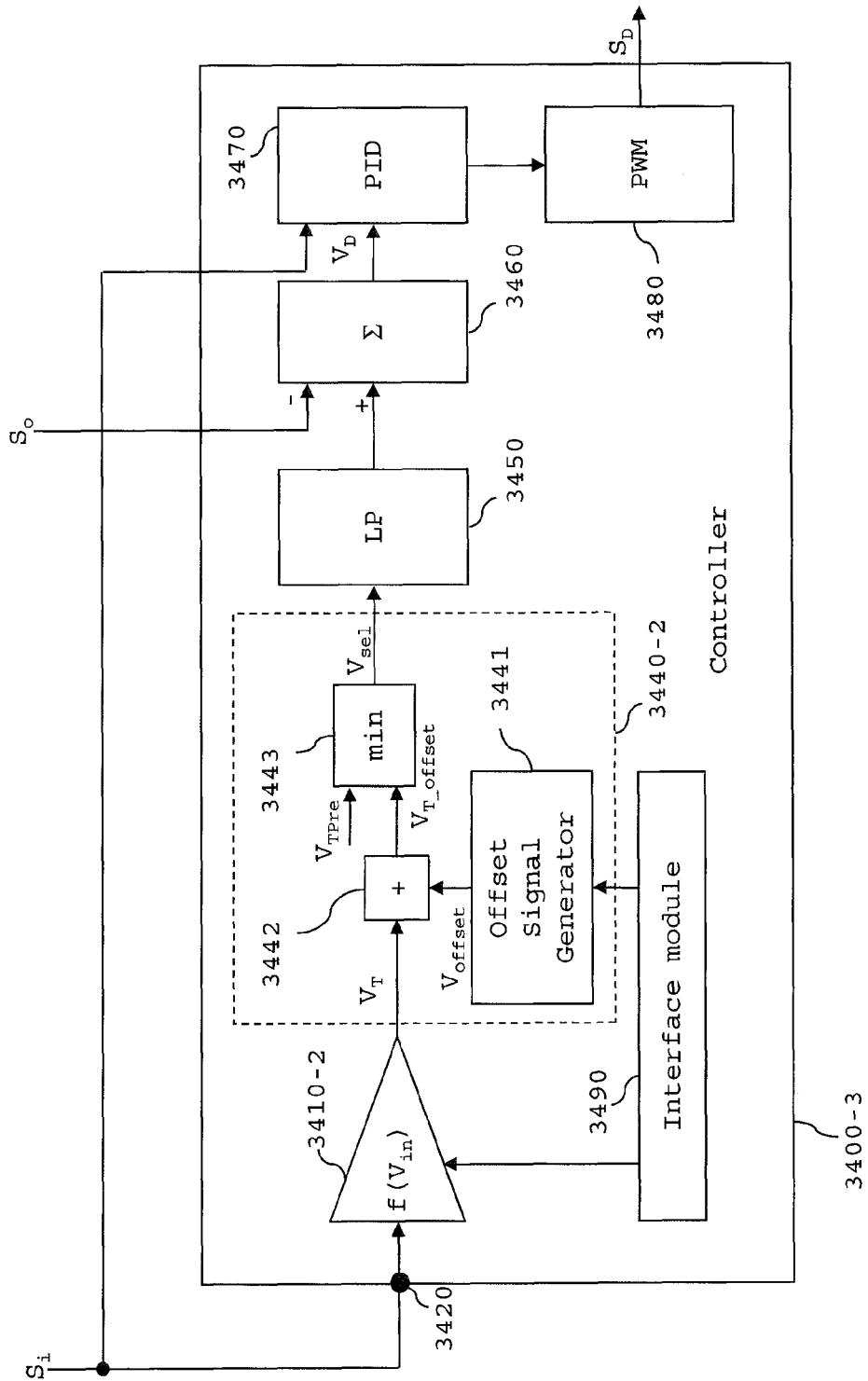
FIG. 16 is a schematic showing components of an IBC controller that forms part of an IBA power supply system according to a third embodiment of the present invention.

As can be appreciated from a comparison of FIGS. 12 and 16, the controllers 3400-2 and 3400-3 of the second and third embodiments have many features in common, and the description of the structure and functionality of these common components will therefore not be repeated. However, the offset target voltage signal generator 3440-2 of the third embodiment differs from that of the second embodiment, and the structure and operation of this component of the controller 3400-3 will now be described in detail.

The controller 3400-3 is capable of operating in one of two modes, and switching from operating in one mode to the other in dependence on $V_{in}$. In a first mode of operation (also referred to herein as the "Regulated Ratio" mode), the offset target voltage signal generator 3440-2 is operable to function as the offset target voltage signal generator 3440-1 of the above-described second embodiment. However, in contrast to the offset target voltage signal generator 3440-1 of the second embodiment, the offset target voltage signal generator 3440-2 of the third embodiment is also operable in a second mode (also referred to herein as the "Fully Regulated" mode) to generate a predetermined target voltage signal $V_{TPre}$, which is set to a desired level. The size of $V_{TPre}$ may be set to a fixed value or may be made adjustable by the user of the IBC 3000. In this way, in its second mode, the offset target voltage signal generator 3440-2 functions in the same manner as the target voltage signal generator 3410-1 of the above-described first embodiment.

As will be explained in the following, the offset target voltage signal generator 3440-2 is configured to operate in the second mode when the input voltage $V_{in}$ exceeds a threshold value, and to operate in the first mode when the input voltage $V_{in}$ is equal to or smaller than the threshold value.

As shown in FIG. 16, the offset target voltage signal generator 3440-2 of the third embodiment comprises a target voltage signal selector 3443, which functions to control the switching between the first and second modes of operation of the offset target voltage signal generator 3440-2. More specifically, as shown in FIG. 16, the target voltage signal selector 3443 is operable to receive the predetermined target voltage signal $V_{TPre}$ from e.g. a precision reference, and the offset target voltage signal $V_{T\_offset}$ from the adder 3442, and then select, as the target voltage signal to be provided to the deviation signal generator 3460 via the low-pass filter 3450, the smaller of these received signals according to the following equation:

$$V_{Sel} = \min\{V_{T\_offset}, V_{TPre}\} \qquad \text{Equation 5}$$

Figure 17:
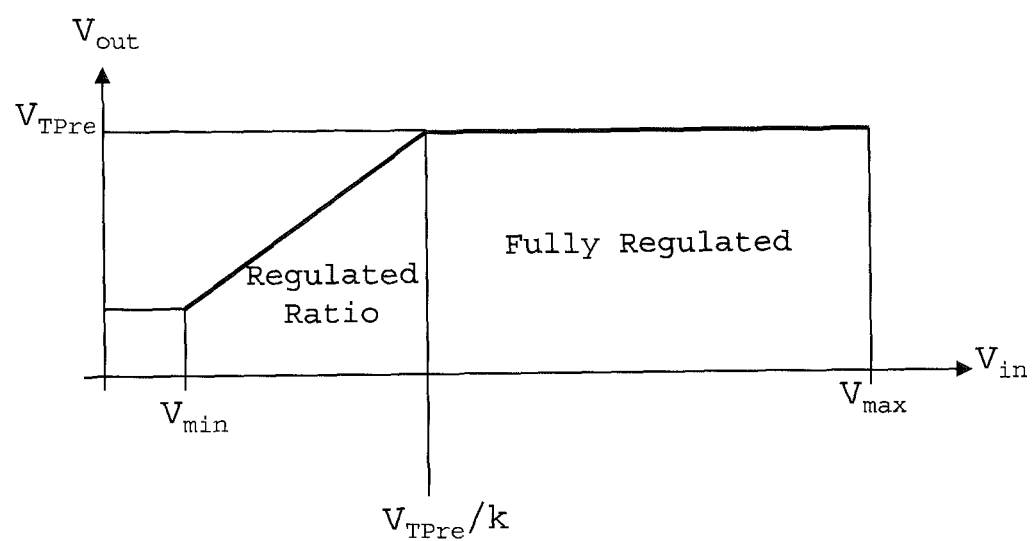
FIG. 17 illustrates the variation of the output voltage as a function of the input voltage of the IBC forming part of the IBA power supply system of the third embodiment.

In Equation 5, "min" denotes the minimum function which selects the minimum value of the operands, and $V_{Sel}$ is the signal output to the deviation signal generator 3460 via the low-pass filter 3450. The output voltage $V_{out}$ as a function of the input voltage $V_{in}$ is illustrated in FIG. 17.

There are significant advantages associated with the capability of the offset target voltage signal generator 3440-2 to switch from operating in one of the two above-described operational modes to the other mode, depending on the prevailing IBC 3000 input voltage $V_{in}$ level.

Figure 18:
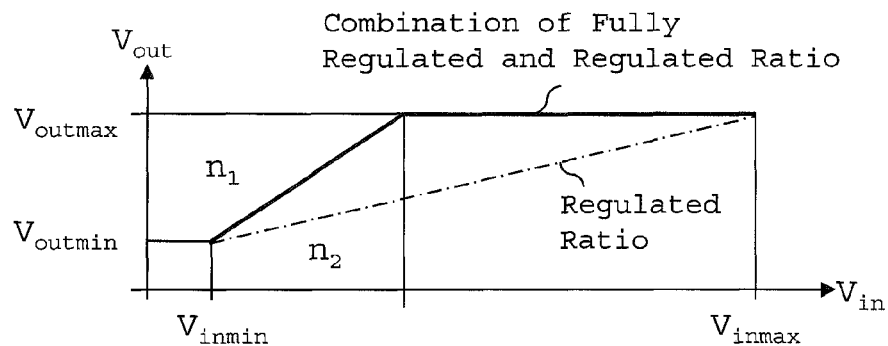
FIG. 18 is another schematic illustrating the variation of the output voltage as a function of the input voltage of the IBC, which shows how the ability of the offset target voltage signal generator of the third embodiment to switch between the first and second operational modes allows a higher transformer ratio to be used in the IBC.

For example, as can be appreciated from the variation of the IBC 3000 output voltage $V_{out}$ with the input voltage $V_{in}$ shown schematically in FIG. 18, using the above-described combination of the Fully Regulated and the Regulated Ratio modes of operation (i.e. the combination of the above-described first and second modes) may allow for a higher transformer turns ratio to be used in the IBC 3000 as compared to the case where the offset target voltage signal generator 3440-2 is configured to operate in the Regulated Ratio mode only. As shown in FIG. 18, turns ratio $n_1$ required for the combination is greater than the turns ratio $n_2$ required when operation is limited to the Regulated Ratio mode.

Figure 19:
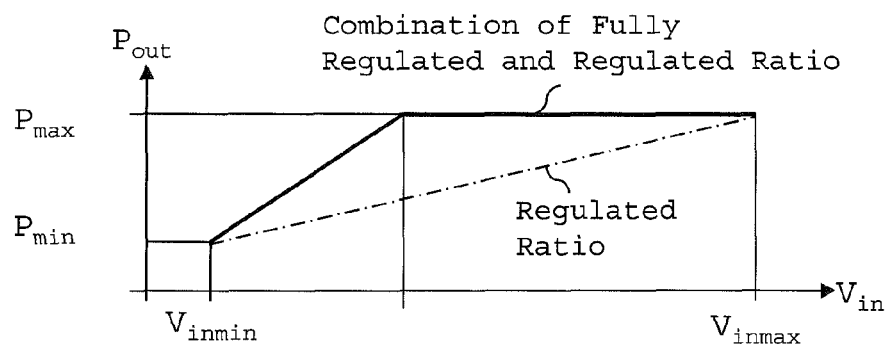
FIG. 19 is a schematic illustrating how the power output of the IBC varies with input voltage, and shows how the ability of the offset target voltage signal generator of the third embodiment to switch between the first and second operational modes increases the power output of the IBC.

Furthermore, as illustrated in FIG. 19, where the control strategy employs the above-described combination of the Fully Regulated and the Regulated Ratio operational modes, the output voltage $V_{out}$ may be larger in the whole working region, which may allow the output power $P_{out}$ to be increased without increasing the output current that is the limiting factor in the design.

Figure 20:
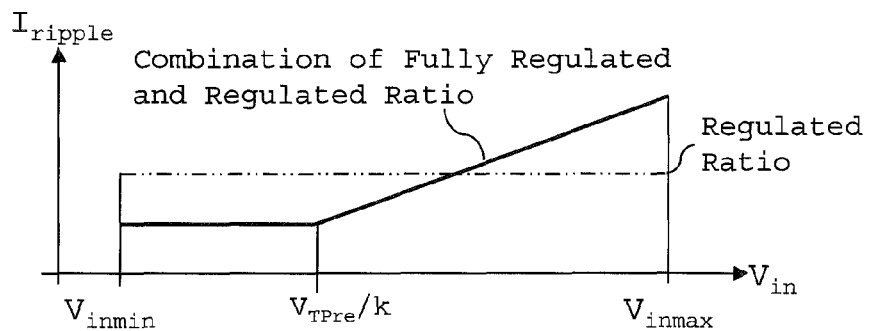
FIG. 20 is a schematic illustrating how the ripple current in the output choke of the IBC varies with input voltage for the IBC forming part of the IBA power supply system of the third embodiment.

FIG. 20 is a schematic illustrating the variation of the IBC's output current ripple $I_{ripple}$ with the input voltage $V_{in}$. Where the offset target voltage signal generator 3440-2 operates in the Regulated Ratio mode, the output current ripple $I_{ripple}$ is constant and independent of the input voltage $V_{in}$, in contrast with the Fully Regulated part of the combination control strategy, where the current ripple $I_{ripple}$ increases with input voltage $V_{in}$. This implies that the pure Regulated Ratio can use a smaller inductor for a given ripple requirement than the combination control strategy. However, a larger inductor is preferable in terms of active current sharing.

Experimental Results

The inventors have performed experiments to test the effectiveness of the regulated IBC described herein in suppressing inrush currents and voltage transients that would otherwise occur on the IVB 1400 when the IBC's input voltage changes abruptly. The results of these experiments are shown in FIGS. 21 to 24.

Figure 21:
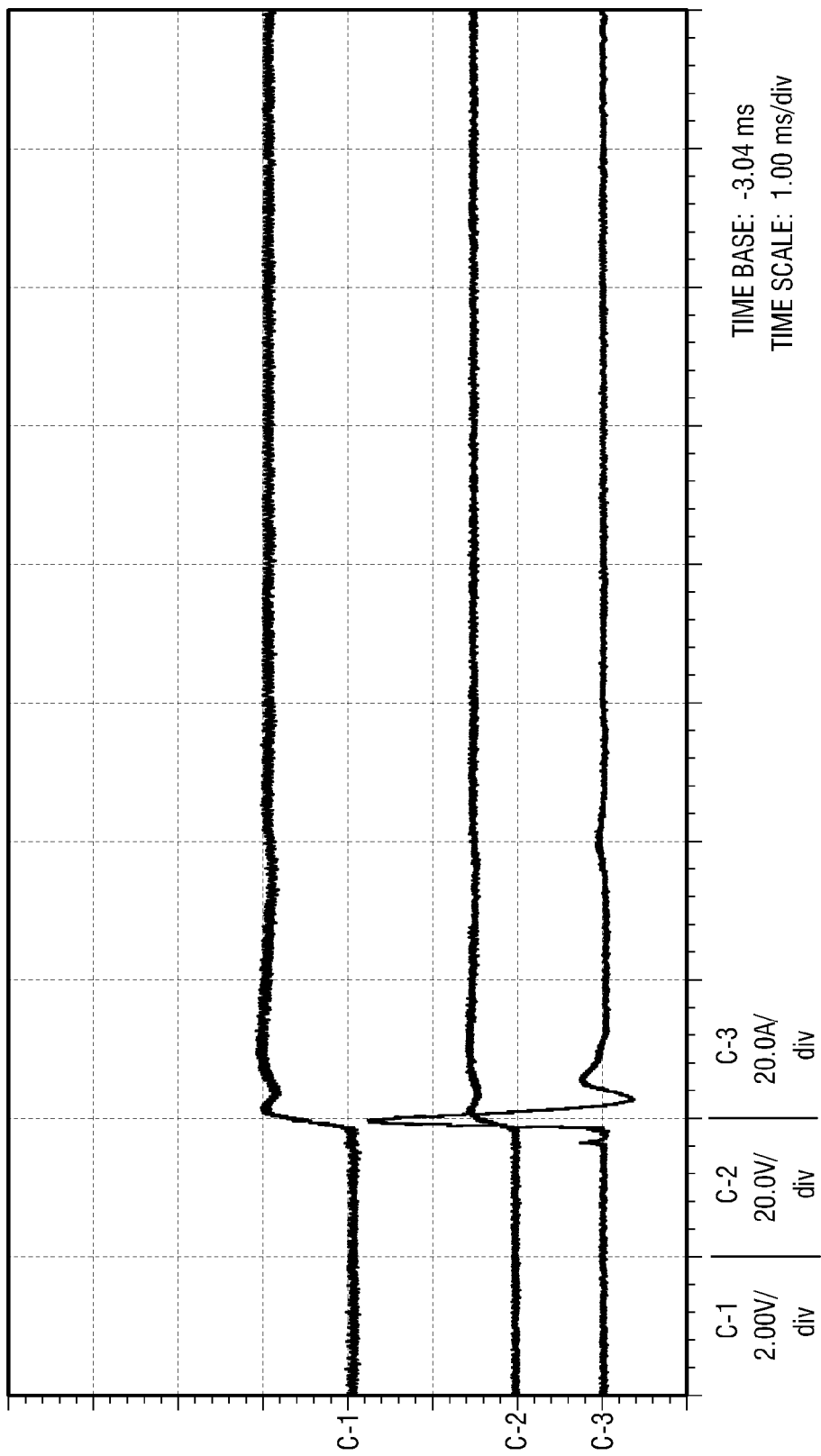
FIG. 21 shows experimental results which illustrate the large load current transient that occurs when a voltage step is applied to the input of a background example IBC.
Figure 22:
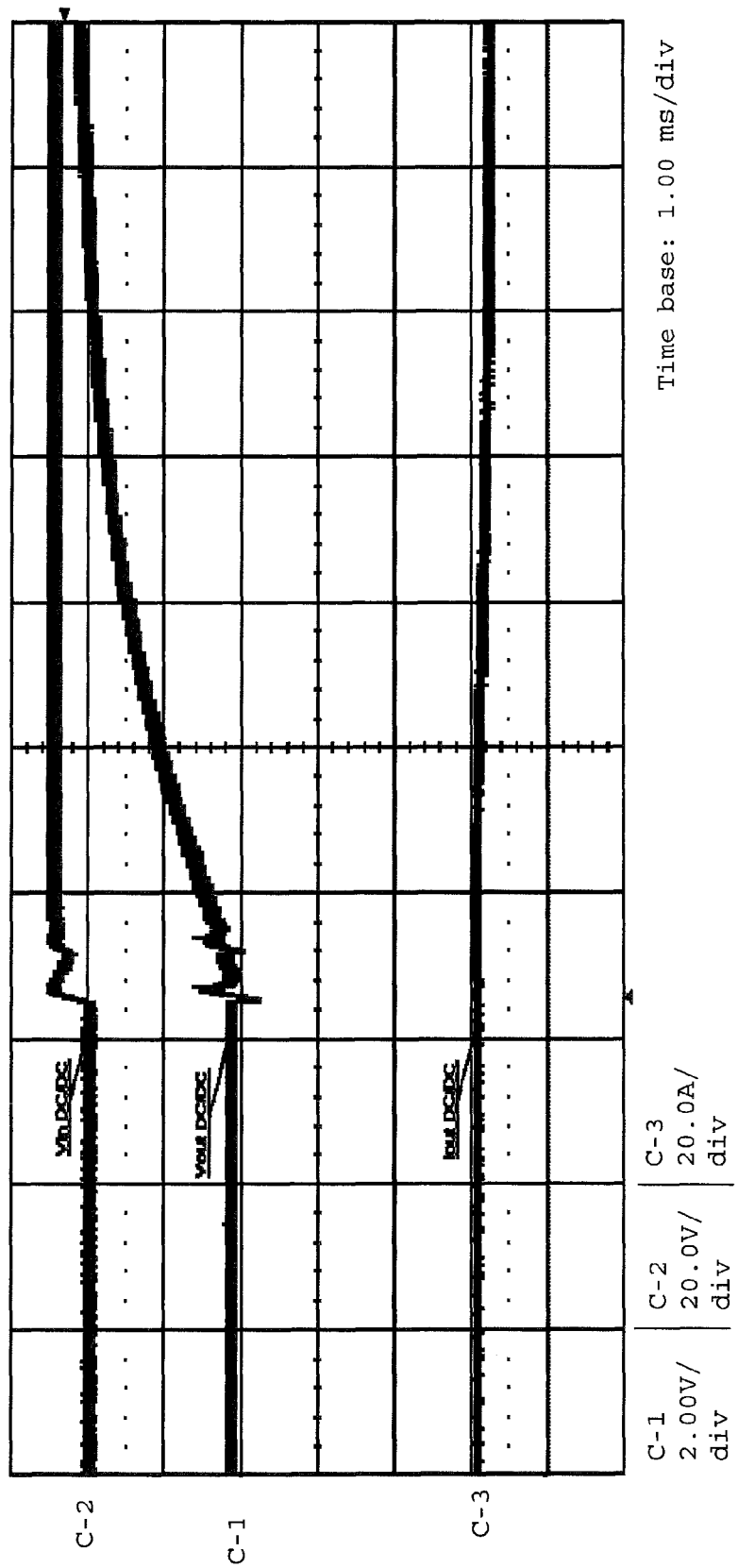
FIG. 22 shows experimental results which illustrate the effective suppression of the load current transient that occurs in an IBC of an IBA power supply system according to an embodiment of the present invention under the same experimental conditions as those in FIG. 21.

FIGS. 21 and 22 show measurement results obtained from an unregulated IBC, and an IBC 3000 according to the second embodiment of the present invention, respectively.

In both cases, the output of the IBC was connected to a bank of capacitors with low ESR to simulate the decoupling capacitance of the IVB in the IBA power supply system. The capacitor bank had a total capacitance of 2.5 mF, and the input voltage $V_{in}$ to the IBC was stepped up from 40 V to 50 V. In FIGS. 21 and 22, trace C-1 shows the measured output voltage $V_{out}$, trace C-2 shows the measured input voltage $V_{in}$, and trace C-3 shows the measured load current to the load capacitor bank.

In the background example of FIG. 21, the load current increases sharply in response to the input voltage $V_{in}$ step, rising to a peak value of about 55 A. The output voltage $V_{out}$ changes as quickly as the input voltage $V_{in}$, which causes ringing on both the input voltage line and the output voltage line when a low impedance source with a large input capacitor is used.

FIG. 22 shows that, in the IBC 3000 of the second embodiment, the inrush current to the load capacitors is virtually eliminated. Instead, the output current changes smoothly between its initial and final values, with no large fluctuations. In this case, the input voltage $V_{in}$ step of 10 V produces a 2 V change in the output voltage $V_{out}$ over approximately 3 ms, as compared to 100 microseconds or so in the case of FIG. 21. As with the output current, the output voltage $V_{out}$ also changes smoothly between its initial and final values, with no large fluctuations. This smooth change in the output current and output voltage also ensures that power delivery to the IBC's load remains constant. This is clearly not the case in the background example of FIG. 21, where the output voltage $V_{out}$ is relatively stable whilst the output current fluctuations remain large. It should be noted that the oscillations in the measured input voltage $V_{in}$ illustrated by trace C-2 in FIG. 22 are due to noise.

Figure 23:
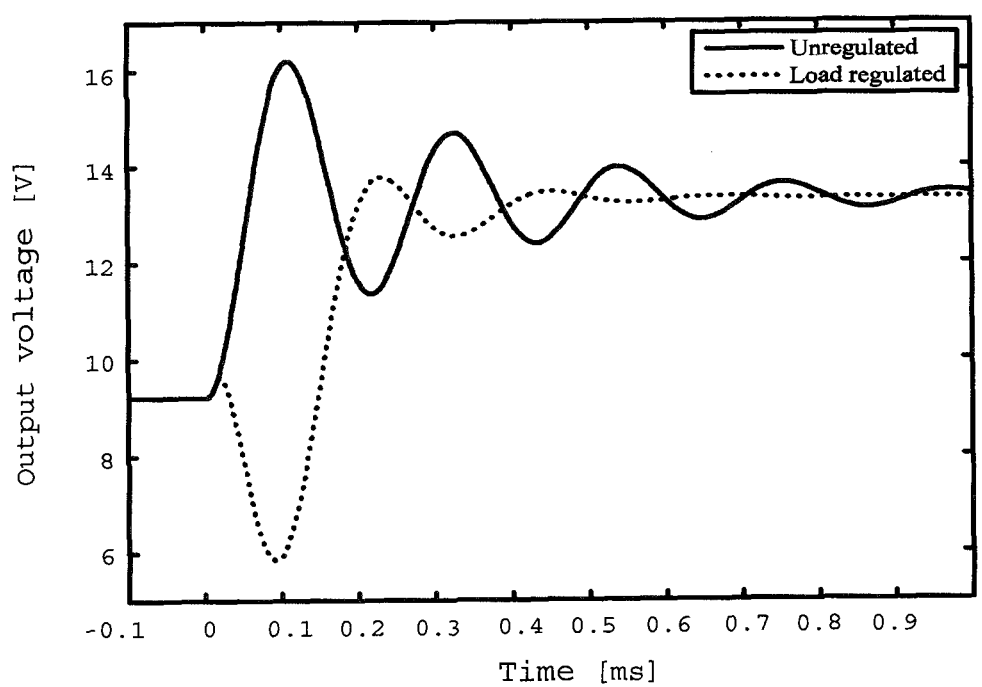
FIG. 23 shows experimental results from a test comparing the performance of an IBC of an IBA power supply system according to an embodiment of the present invention with a known unregulated IBC for the case of an input voltage step from 38 V to 55 V with a load current of 0 A.
Figure 24:
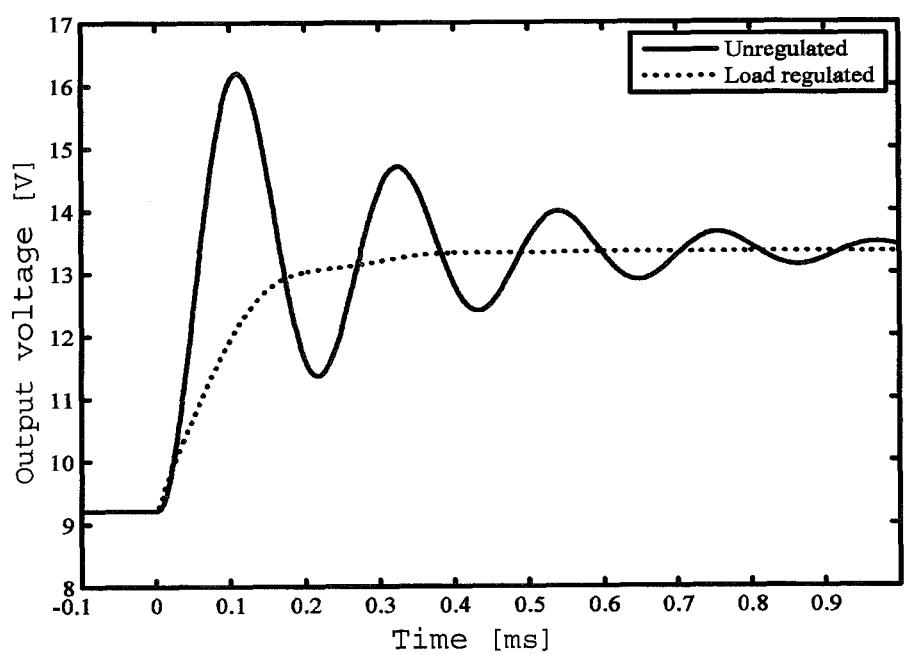
FIG. 24 shows the results of the same experiment as performed in FIG. 23 but with a minimum switching duty cycle imposed on the control of the IBC of an IBA power supply system according to an embodiment of the present invention.

FIGS. 23 and 24 show the results of experiments performed by the inventors to compare the performance of a regulated IBC 3000, controlled using a controller according to an embodiment of the present invention, with that of an unregulated IBC, to demonstrate the superior response of the IVB voltage to fluctuations in the IBC's input voltage.

More particularly, the controller used in the regulated IBC 3000 was substantially the same as that shown in FIG. 12 and described above, however some components were omitted or reconfigured. The offset target voltage generator 3440-1, and low-pass filter 3450 were omitted from the controller and the PID regulator 3470 was configured to generate the signal defining a switching duty cycle in dependence upon only the deviation signal $V_D$.

In the experiments, the IBCs had an input voltage $V_{in}$ range of 38-55V and a transformer ratio of 4:1, yielding an ideal output voltage $V_{out}$ range of 9.5-13.75 V.

In FIG. 23, the input voltage transients of the fixed ratio (4:1) unregulated IBC, and the regulated IBC 3000, are shown for a scenario in which the input voltage $V_{in}$ step raises from 38 V to 55 V with a rise time of 100 μs and with a load current of 0 A.

The unregulated IBC shows a rapid output voltage $V_{out}$ increase with a large overshoot and large ringing with less damping compared with the regulated IBC 3000.

The inventors have found that the voltage dip in the regulated IBC 3000 is due to a delay in the measurement of the input voltage $V_{in}$ by the controller, and have further found that reducing this delay may reduce this dip.

The inventors have also found that another possible solution to prevent the initial dip in output voltage $V_{out}$ of the regulated IBC 3000 is to perform control using the controller to limit the switching duty cycle range, so as to apply a minimum switching duty cycle, for example of 70%. This prevents the switch control signal generator 3480 from outputting a switch control signal $S_D$ with a switching duty cycle below 70%.

The simulation of FIG. 23 (voltage rise from 38 V to 55 V with a rise time of 100 μs and with a load current of 0 A) was therefore repeated applying a minimum switching duty cycle of 70% to the primary side circuit 3100 of the regulated IBC 3000. The results are shown in FIG. 24. As shown in FIG. 24, the dip is removed and the damping of the oscillations is improved by applying a minimum switching duty cycle threshold.

Modifications and Variations

Many modifications and variations can be made to the embodiments described above, without departing from the scope of the present invention.

For example, the controller 3400 can be implemented using either analog or digital electronics, with no loss of performance. In a digital implementation of the controller 3400, the target voltage signal generator 3410-1, 3410-2, the offset target voltage signal generator 3440, the deviation signal generator 3460 and/or the regulator 3470 may be implemented as software components that may form at least a part of a computer program, module, object or sequence of instructions executable by a programmable signal processing apparatus such as a microprocessor.

The offset target voltage signal generator 3440-2 of the above-described third embodiment is configured to switch between its first and second modes of operation by the target voltage signal selector 3443 selecting the smaller of signals $V_{TPre}$ and $V_{T\_offset}$ which have been generated by a reference source and the adder 3442, respectively. However, the switch may alternatively be performed by comparing the signal indicative of the IBC input voltage $V_{in}$ against a threshold and then generating either $V_{TPre}$ or $V_{T\_offset}$, depending on the result of this comparison.

Although the low-pass filter 3450 is provided between the offset target voltage signal generator 3440 and the deviation signal generator 3460 in the second and third embodiments described above, it should be noted that the low-pass filter 3450 may alternatively be provided elsewhere in the controller 3400 so as to filter the signal $S_i$ indicative of the IBC input voltage $V_{out}$ or a signal based thereon before the signal is passed to the deviation signal generator 3460. Thus, more generally, the low pass filter 3450 may be provided anywhere between the input terminal 3420 and the deviation signal generator 3460. In this connection, it should be noted that the input terminal 3420 need not be provided on the circuit board of the controller 3400 and should be regarded more generally as any node or point in the controller 3400 that receives a signal indicative of the input voltage $V_{in}$. However, in some analog implementations of the controller 3400, in which one or more of the components themselves are significant sources of noise, it may be advantageous to connect the low-pass filter 3450 directly to an input of the deviation signal generator 3460, as in the above-described second and third embodiments.

The regulator 3470 may be of any type and not specifically a PID regulator. For example, it may be a PI, PD, or lead lag compensation regulator, or another type of regulator.

The controller 3400 may be placed on either the primary or the secondary side of the isolation barrier 3500 in the IBC 3000. Depending on the placement of the controller 3400, one or more of the signals $S_i$, $S_O$ and $S_D$ may need to be transferred over the isolation barrier 3500 whilst maintaining galvanic isolation of the primary side circuit 3100 and secondary side circuit 3300. There are many well-known techniques for achieving this, as described in relation to device 3600-1 in FIG. 3.

Further, the primary side circuit 3100 is not limited to an H-bridge topology and may use any number and arrangement of switching elements to create an alternating voltage in the primary winding of the voltage transformer 3200.

The embodiments described above employ secondary side control of the IBC's switching elements, with all of the components of the controller 3400 (including the switch control signal generator 3480) being provided on the secondary side of the isolation barrier 3500. However, the components of the controller 3400 need not all be provided on the same side of the isolation barrier 3500. For example, in the case of primary side control of the IBC elements' switching, the switch control signal generator 3480 may be disposed on the primary side of the isolation barrier 3500, with the remaining components of the controller 3400 being disposed on the secondary side of the isolation barrier 3500. In this case, the signal received by the switch control signal generator 3480 (either from the regulator 3470 or, as the case may be, from the deviation signal generator 3460) would be transferred across the isolation barrier 3500. There are many well-known techniques for achieving this, as described in relation to device 3600-1 in FIG. 3.

Additionally, the topology of the voltage transformer 3200 is also not limited to that shown in FIGS. 6 and 15. Specifically the secondary side winding may be centre-tapped, as shown, multi-tapped or a single winding.

Furthermore, the secondary side circuit 3300 is not limited to a synchronous rectification topology, and full- or half-wave rectification may be used and provided by diodes instead of active switching elements.

The inventors have found that the above-described IBA power supply system 2000 may work particularly well when the controller 3400 is implemented with active droop, which may enable passive current sharing or the paralleling of several identical IBCs within the system. In embodiments which incorporate active droop, the deviation signal generator 3460 is further arranged to received a signal indicative of the output current of the IBC 3000 and generate the deviation signal $V_D$ in dependence on the signal indicative of the output current, the target voltage signal $V_T$ and the feedback signal $S_O$.

Figure 25:
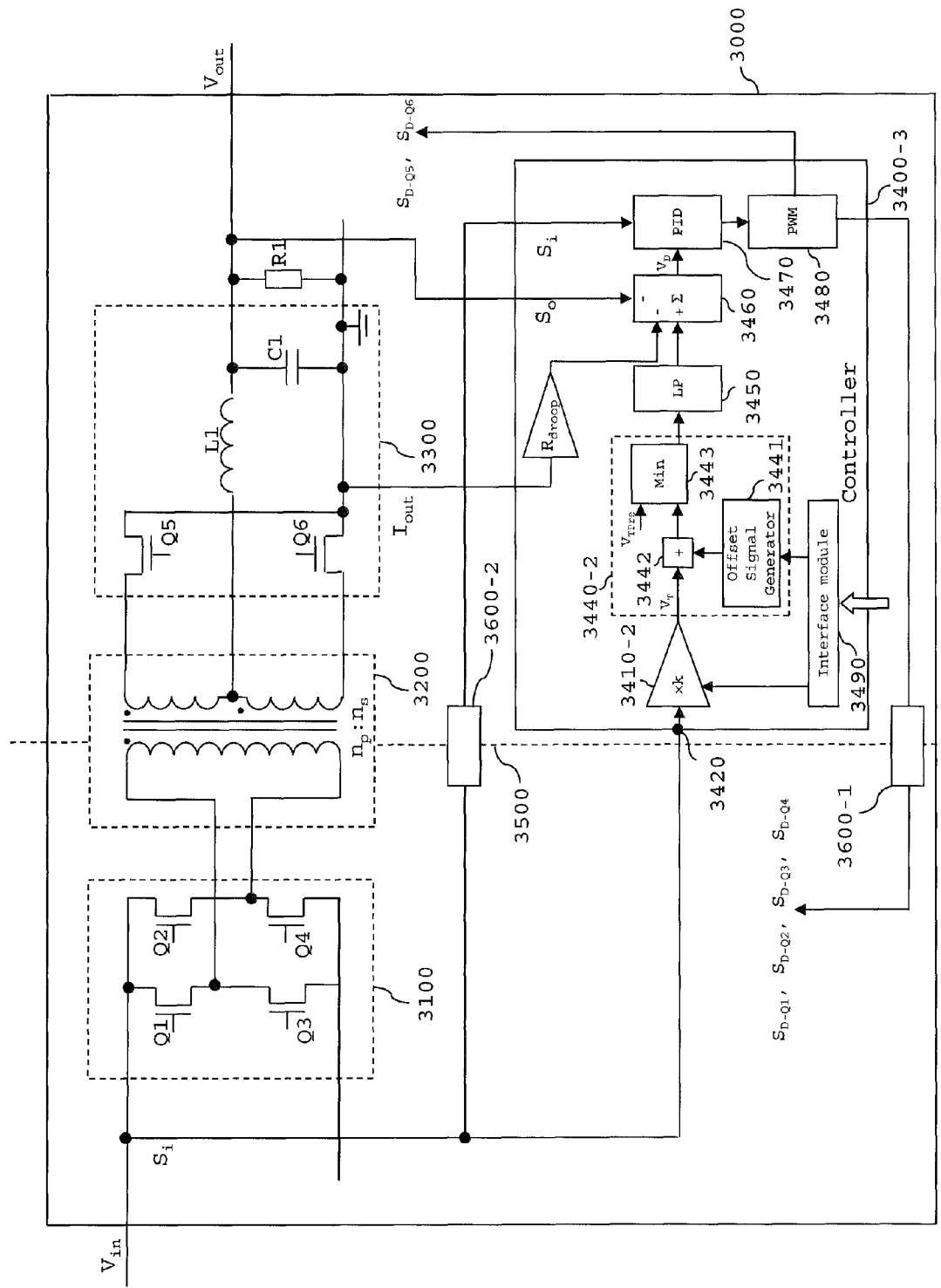
FIG. 25 shows details of the IBC forming part of the IBA power supply system of the third embodiment with the inclusion of droop processing.

By way of example, FIG. 25 shows a modification of the controller 3400-3 of the third embodiment which incorporates active droop. In this variant, the active droop is obtained by measuring the output current $I_{out}$ and then modifying the calculation of the deviation signal $V_D$ according to the following equation:

$$V_D = \min\{V_{T\_offset}, V_{TPre}\} - S_O - I_{out}R_{droop} \qquad \text{Equation 6}$$

In Eqn. 6 above, $I_{out}$ is the output current of the IBC 3000 and $R_{droop}$ is the artificial droop resistance.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. An intermediate bus architecture power supply system comprising a first stage switching voltage converter arranged to convert an input voltage at an input of the first stage switching voltage converter to an output voltage at an output of the first stage switching voltage converter, the output of the first stage switching voltage converter being connected via an intermediate voltage bus to an input of at least one second stage DC-to-DC voltage converter, the first stage switching voltage converter comprising:
   a primary side circuit connected to the input of the first stage switching voltage converter and comprising a switching element;
   a secondary side circuit coupled to the primary side circuit by a galvanically isolated voltage transformer that provides an isolation barrier between the primary and secondary side circuits, the voltage transformer being arranged to transform a primary side voltage generated by switching of the switching element in the primary side circuit to a secondary side voltage, the secondary side circuit comprising:
      a rectifying circuit arranged to rectify the secondary side voltage from the voltage transformer to generate the output voltage; and
      a feedback signal generator arranged to generate a feedback signal indicative of the output voltage of the first stage switching voltage converter;
   the first stage switching voltage converter further comprising a controller operable to generate a switch control signal to control a switching duty cycle of the switching element, the controller comprising:
   an input terminal for receiving a signal indicative of the input voltage of the first stage switching voltage converter;
   a target voltage signal generator operable to generate a target voltage signal that is indicative of a target output voltage of the first stage switching voltage converter, wherein the target voltage signal generator is operable to generate, in dependence upon the signal received via the input terminal, the target voltage signal as a function of the input voltage;
   a deviation signal generator arranged to receive the feedback signal and operable to generate a deviation signal based on the target voltage signal and based on the feedback signal, wherein the deviation signal is indicative of a deviation of the output voltage of the first stage switching voltage converter from the target output voltage; and
   a switch control signal generator operable to generate the switch control signal to control the switching duty cycle of the first stage switching voltage converter in dependence upon the deviation signal.

2. The intermediate bus architecture power supply system according to claim 1, wherein the target voltage signal generator is operable to generate a predetermined target voltage signal that is independent of the input voltage.

3. The intermediate bus architecture power supply system according to claim 1, wherein the controller further comprises a low pass filter connected between the input terminal and the deviation signal generator, in series with the target voltage signal generator.

4. The intermediate bus architecture power supply system according to claim 3, wherein the low pass filter has a user adjustable time constant.

5. The intermediate bus architecture power supply system according to claim 3, wherein the low pass filter is arranged to respond to an increase in the input voltage of the first stage switching voltage converter with a first time constant, and to a decrease in the input voltage of the first stage switching voltage converter with a second time constant that is different from the first time constant.

6. The intermediate bus architecture power supply system according to claim 5, wherein the first time constant is between 0.3 ms and 3 ms, and the second time constant is between 0.06 ms and 0.6 ms.

7. The intermediate bus architecture power supply system according to claim 1, wherein the controller further comprises an offset target voltage signal generator operable to generate an offset target voltage signal by combining the target voltage signal with an offset signal, the offset signal being independent of the input voltage;
   wherein the deviation signal generator is operable to generate the deviation signal based on the offset target voltage signal and based on the output voltage.

8. The intermediate bus architecture power supply system according to claim 7, wherein the offset target voltage signal generator comprises an offset signal generator operable to generate a variable offset signal.

9. The intermediate bus architecture power supply system according to claim 8, wherein the offset signal generator is arranged to receive a signal indicative of a measured temperature of the first stage switching voltage converter and arranged to generate the offset signal in dependence upon the measured temperature.

10. The intermediate bus architecture power supply system according to claim 8, wherein the offset signal generator is arranged to receive a signal indicative of an output load of the first stage switching voltage converter and arranged to generate the offset signal in dependence upon the output load.

11. The intermediate bus architecture power supply system according to claim 8, wherein the offset signal generator is arranged to receive a signal indicative of an input from a user and arranged to generate the offset signal in dependence upon the received signal.

12. The intermediate bus architecture power supply system according to claim 7, wherein the offset target voltage signal generator comprises an adder arranged to add the offset signal to the target voltage signal.

13. The intermediate bus architecture power supply system according to claim 7, wherein:
   the offset target voltage signal generator is operable in a first mode to generate the offset target voltage signal by combining the target voltage signal with an offset signal, the offset signal being independent of the input voltage, and operable in a second mode to generate a predetermined target voltage signal that is independent of the input voltage, the offset target voltage signal generator being configured to operate in the second mode when the input voltage exceeds a threshold value, and to operate in the first mode when the input voltage is equal to or smaller than said threshold value; and
   the deviation signal generator is operable to generate the deviation signal based on the offset target voltage signal and based on the output voltage when the offset target voltage signal generator operates in the first mode, and is operable to generate the deviation signal based on the predetermined target voltage signal and based on the output voltage when the offset target voltage signal generator operates in the second mode.

14. The intermediate bus architecture power supply system according to claim 13, wherein the offset target voltage signal generator comprises a target voltage signal selector operable to select the smaller of the generated offset target voltage signal and the predetermined target voltage signal for output by the offset target voltage signal generator.

15. The intermediate bus architecture power supply system according to claim 1, wherein the target voltage signal generator is arranged to receive a signal indicative of an input from a user and arranged to set, in dependence upon the received signal, the function which relates the target voltage signal to the input voltage.

16. The intermediate bus architecture power supply system according to claim 1, wherein the deviation signal generator is arranged to generate the deviation signal by subtracting one of the feedback signal and the target voltage signal from the other of the feedback signal and the target voltage signal.

17. The intermediate bus architecture power supply system according to claim 1, wherein the deviation signal generator is arranged to receive a signal indicative of an output current of the first stage switching voltage converter and operable to generate the deviation signal based on the target voltage signal, the feedback signal and the output current.

18. The intermediate bus architecture power supply system according to claim 1, wherein the controller further comprises a regulator operable to generate a signal defining a duty cycle to be used by the first stage switching voltage converter in dependence upon the deviation signal;
   wherein the switch control signal generator is arranged to generate the switch control signal in dependence upon the signal defining the duty cycle.

19. The intermediate bus architecture power supply system according to claim 18, wherein the regulator is further arranged to generate the signal defining the duty cycle in dependence upon both the deviation signal and the received signal that is indicative of the input voltage.

20. The intermediate bus architecture power supply system according to claim 19, wherein the regulator is operable to:
generate the signal defining the switching duty cycle in dependence upon the deviation signal, the received signal that is indicative of the input voltage, and at least one control parameter; and
adjust the at least one control parameter in dependence upon the received signal that is indicative of the input voltage.

21. The intermediate bus architecture power supply system according to claim 18, wherein the regulator is one of a PID regulator, a PI regulator, a PD regulator and a lead lag compensation regulator.

22. The intermediate bus architecture power supply system according to claim 1, wherein the switch control signal generator comprises a pulse width modulator.

23. The intermediate bus architecture power supply system according to claim 1, wherein the switch control signal generator is arranged to generate a switch control signal to keep the duty cycle of the first stage switching voltage converter above a predetermined minimum value.

24. The intermediate bus architecture power supply system according to claim 1, further comprising a power input module arranged to supply the input voltage to the input of the first stage switching voltage converter, the power input module comprising:
a first input for receiving power from a first power source and a second input for receiving power from a second power source;
an input selector operable to select, in dependence upon a first voltage at the first input of the power input module and a second voltage at the second input of the power input module, at least one of the first and second inputs of the power input module from which the power input module is to draw power and generate the input voltage for the first stage switching voltage converter;
a power supply interruption detector arranged to detect an interruption in power drawn from at least one of the first and second inputs of the power input module; and
an interrupt delay circuit comprising a delay capacitor, the interrupt delay circuit being arranged to:
charge the delay capacitor with current from one or both of the first and second inputs of the power input module to a third voltage that is higher than each of the first and second voltages; and
in response to a detection of an interruption in power drawn from at least one of the first and second inputs of the power input module by the power supply interruption detector, discharge the delay capacitor through the input of the first stage switching voltage converter.

* * * * *